US012749353B2

(12) United States Patent
Sekiya et al.

(10) Patent No.: US 12,749,353 B2
(45) Date of Patent: Sep. 29, 2026

(54) ANALYSIS DEVICE AND ANALYSIS METHOD

(71) Applicant: Panasonic Automotive Systems Co., Ltd., Kanagawa (JP)

(72) Inventors: Shoichiro Sekiya, Osaka (JP); Yuishi Torisaki, Osaka (JP); Takayoshi Ito, Osaka (JP); Kaoru Yokota, Hyogo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 19/022,726

(22) Filed: Jan. 15, 2025

(65) Prior Publication Data

US 2025/0157269 A1 May 15, 2025

Related U.S. Application Data

(63) Continuation of application No. PCT/JP2023/034739, filed on Sep. 25, 2023.

(30) Foreign Application Priority Data

Oct. 17, 2022 (JP) ................................ 2022-166419

(51) Int. Cl.
*G07C 5/08* (2006.01)
*G07C 5/00* (2006.01)
*G06F 11/34* (2006.01)

(52) U.S. Cl.
CPC ............... *G07C 5/08* (2013.01); *G07C 5/008* (2013.01)

(58) Field of Classification Search
CPC ........... G07C 5/08; G07C 5/008; G06F 11/34; G06F 21/62
See application file for complete search history.

(56) References Cited

U.S. PATENT DOCUMENTS 11,531,686 B2 * 12/2022 Calco .................... H04L 9/3239
2011/0276541 A1 11/2011 Ono
(Continued)

FOREIGN PATENT DOCUMENTS

JP 2011-237975 A 11/2011
JP 2013-084212 A 5/2013
(Continued)

OTHER PUBLICATIONS

International Search Report issued in WIPO Patent Application No. PCT/JP2023/034739, dated Nov. 14, 2023, along with an English translation thereof.
(Continued)

*Primary Examiner* — Tan Q Nguyen
(74) *Attorney, Agent, or Firm* — Greenblum & Bernstein, P.L.C.

(57) ABSTRACT

A first analysis device is an analysis device that transmits report information based on an analysis result of a log regarding a vehicle and includes: an obtainer that obtains a first anonymized log that is the log including first anonymized data of the vehicle; a linking resolution unit that performs linking resolution that is processing for determining, from second anonymized data included in each of a plurality of second anonymized logs included in a second system, second anonymized data corresponding to the first anonymized data as specific second anonymized data; a system cooperator that obtains, from the second system, a second anonymized log including the specific second anonymized data as a second anonymized log to be integrated; and an integrated analyzer that performs analysis of a log group including the first anonymized log and the second anonymized log to be integrated as integrated analysis.

12 Claims, 15 Drawing Sheets

(56) References Cited

U.S. PATENT DOCUMENTS

| | | | | |
|---|---|---|---|---|
| 2015/0154711 | A1* | 6/2015 | Christopulos | G06Q 30/0201 705/7.29 |
| 2016/0044354 | A1 | 2/2016 | Matsuzaki et al. | |
| 2016/0171243 | A1 | 6/2016 | Maeda et al. | |
| 2019/0371085 | A1* | 12/2019 | Kishikawa | G08G 1/0112 |
| 2021/0232483 | A1 | 7/2021 | Togawa | |
| 2024/0029483 | A1* | 1/2024 | Kuehnle | G07C 5/085 |

FOREIGN PATENT DOCUMENTS

| | | | |
|---|---|---|---|
| JP | 2014-142683 | A | 8/2014 |
| JP | 2016-115330 | A | 6/2016 |
| JP | 2016-186783 | A | 10/2016 |
| JP | 2016-206896 | A | 12/2016 |
| JP | 7078114 | B2 | 5/2022 |

OTHER PUBLICATIONS

Written Opinion of the International Searching Authority (WO/ISA) issued in WIPO Patent Application No. PCT/JP2023/034739, dated Nov. 14, 2023, along with an English translation thereof.

* cited by examiner

| First anonymized data (anonymized VIN) | Second anonymized data (anonymized IP address) | Expiration date |
|---|---|---|
| 07b1f9f9 | a2.0e.42.98 | 2022/07/14 17:50 |
| 1606b45e | 84.56.4a.8f | 2022/07/14 18:50 |
| d67e1937 | f5.be.44.bb | 2022/07/14 19:20 |

ANALYSIS DEVICE AND ANALYSIS METHOD

CROSS REFERENCE TO RELATED APPLICATIONS

This is a continuation application of PCT International Patent Application No. PCT/JP2023/034739 filed on Sep. 25, 2023, designating the United States of America, which is based on and claims priority of Japanese Patent Application No. 2022-166419 filed on Oct. 17, 2022.

FIELD

The present disclosure relates to an analysis device and the like that analyze a log.

BACKGROUND

For example, Patent Literature (PTL) 1 discloses a log analysis device as an analysis device. This log analysis device outputs an alert when a log message to be monitored satisfies a predetermined condition, and extracts a related log, which is a log related to the alert, from the log message. Then, the log analysis device outputs information according to the related log for each same time slot. Accordingly, even when there are a large number of logs, it is possible to narrow down logs that need to be checked.

CITATION LIST

Patent Literature

PTL 1: Japanese Patent No. 7078114

SUMMARY

However, the log analysis device in the above-described PTL 1 can be improved upon.

In view of this, the present disclosure provides an analysis device and the like capable of improving upon the above related art.

An analysis device according to one aspect of the present disclosure is an analysis device that transmits report information based on an analysis result of a log regarding a device to be monitored.

The analysis device includes: an obtainer that obtains a first anonymized log that is the log including first anonymized data of the device to be monitored; a linking resolution unit that performs linking resolution that is processing for determining, from second anonymized data included in each of a plurality of second anonymized logs included in a cooperative monitoring system, second anonymized data corresponding to the first anonymized data as specific second anonymized data; a system cooperator that obtains, from the cooperative monitoring system, a second anonymized log including the specific second anonymized data as a second anonymized log to be integrated; and an integrated analyzer that performs analysis of a log group including the first anonymized log and the second anonymized log to be integrated as integrated analysis.

Note that these general or specific aspects may be implemented using a system, a device, a method, an integrated circuit, a computer program, or a computer-readable recording medium such as a compact disc read-only memory (CD-ROM), or any combination of systems, devices, methods, integrated circuits, computer programs, or recording media. Moreover, the recording medium may be a non-transitory recording medium.

The analysis device of the present disclosure is capable of improving upon the above related art.

Note that further advantage and effects in one aspect of the present disclosure will become apparent from the description and the drawings. Although such advantages and/or effects are provided by the configurations described in one or more embodiments, the description, and the drawings, not all the configurations are necessarily required.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
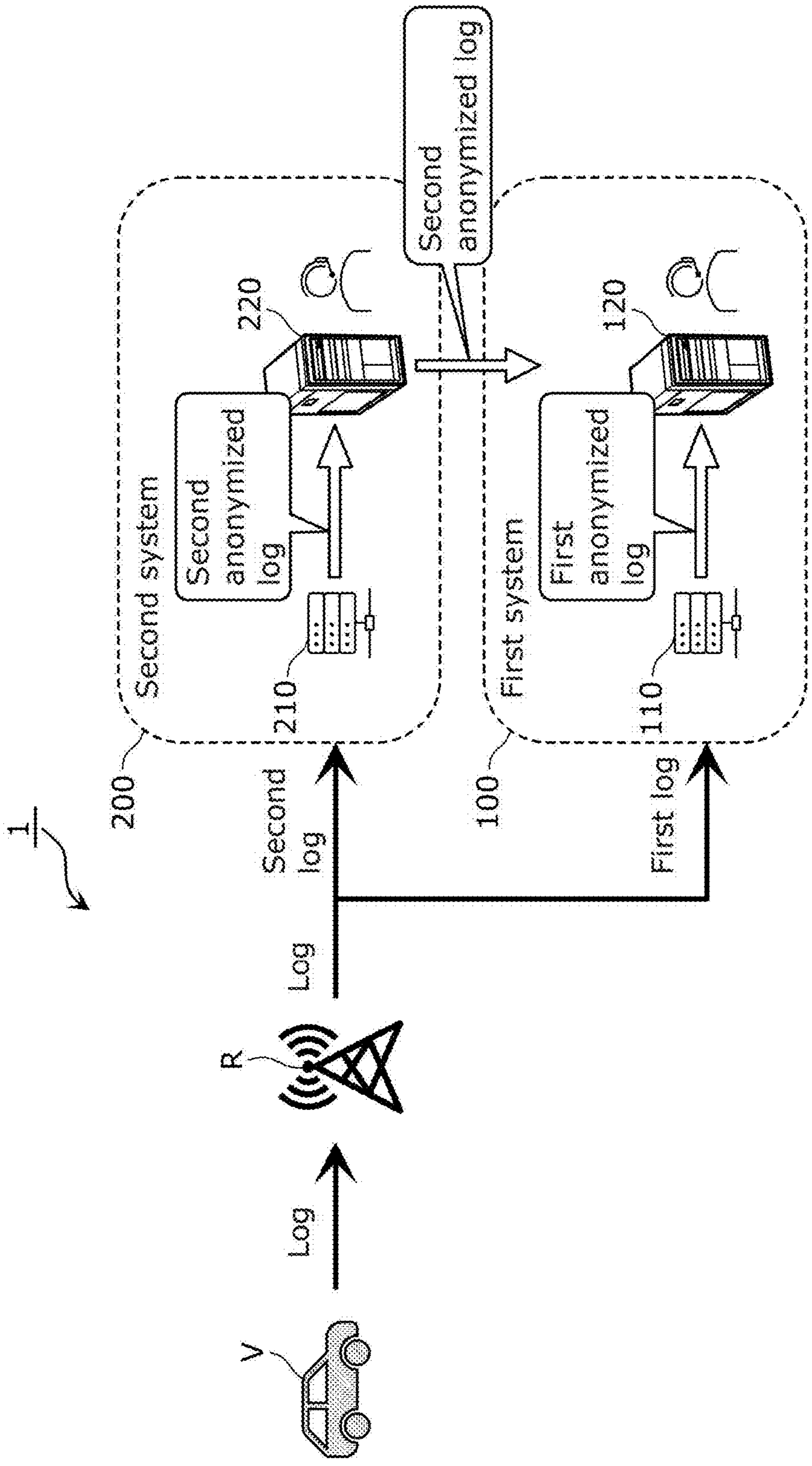
FIG. 1 is a general configuration diagram of an analysis system in an embodiment.

In the log analysis device in the above-described PTL 1, since the logs to be analyzed are narrowed down, there is a problem that it is difficult to improve the analysis accuracy. That is, although the log analysis device in the above-described PTL 1 integrates and analyzes the extracted related logs, those related logs have been narrowed down, and not many logs are used. For example, there are cases where the possibility of improving the analysis accuracy can be increased by integrating and analyzing logs obtained by two or more systems, rather than collecting and analyzing, by these systems, logs from a vehicle to be monitored according to the objects of the systems, respectively. However, when anonymization is performed on logs in a different mode in each of those systems, it is difficult to integrate the logs of the vehicle to be monitored. Accordingly, a large number of logs cannot be used for analysis, which makes it difficult to improve the analysis accuracy.

In view of this, an analysis device according to a first aspect of the present disclosure is an analysis device that transmits report information based on an analysis result of a log regarding a device to be monitored. The analysis device includes: an obtainer that obtains a first anonymized log that is the log including first anonymized data of the device to be monitored; a linking resolution unit that performs linking resolution that is processing for determining, from second anonymized data included in each of a plurality of second anonymized logs included in a cooperative monitoring system, second anonymized data corresponding to the first anonymized data as specific second anonymized data; a system cooperator that obtains, from the cooperative monitoring system, a second anonymized log including the specific second anonymized data as a second anonymized log to be integrated; and an integrated analyzer that performs analysis of a log group including the first anonymized log and the second anonymized log to be integrated as integrated analysis. For example, when a system including the analysis device, and the cooperative monitoring system each obtains a log regarding each of one or more devices, the systems anonymize their logs in mutually different modes. An example of the devices is a vehicle. In addition, in the anonymization of a log, the identification data used for identification of a device and a user recorded in the log, such as, for example, a VIN (Vehicle Identification Number) or an IP (Internet Protocol) address included in the log, is anonymized into anonymization data. In the system including the analysis device, a log regarding a device to be monitored is managed as a first anonymized log including first anonymized data. In addition, in the cooperative monitoring system, a log regarding each device including the device to be monitored is managed as a second anonymized log including second anonymized data.

Here, in the analysis device according to the above-described first aspect of the present disclosure, the second anonymized data corresponding to the first anonymized data is determined as specific second anonymized data by linking resolution. That is, the second anonymized data corresponding to the same device to be monitored as the first anonymized data is determined as the specific second anonymized data, and is linked to the first anonymized data. Accordingly, the second anonymized log regarding the same device to be monitored as the first anonymized log can be obtained from the cooperative monitoring system as a second anonymized log to be integrated. As a result, since integrated analysis can be performed on the first anonymized log and the second anonymized log to be integrated regarding the same device to be monitored, the analysis accuracy can be more improved than the analysis using only the first anonymized log. That is, even when anonymization is performed on logs in mutually different modes in the system including the analysis device and the cooperative monitoring system, the logs regarding the same device to be monitored can be integrated and analyzed, and as a result, the analysis accuracy can be improved.

Moreover, the analysis device according to a second aspect depending from the first aspect may further include: an integrated determiner that determines whether or not the integrated analysis is required, and when it is determined by the integrated determiner that the integrated analysis is required, the linking resolution unit may perform the linking resolution.

Accordingly, since the linking resolution is performed when it is determined that the integrated analysis is required, it is possible to inhibit the linking resolution from being performed also in a case where the integrated analysis is not required, and the processing burden can be reduced. In addition, when the integrated analysis is not required, analysis of the first anonymized log can be performed without using the second anonymized log, and the processing burden can be reduced. Note that whether or not the integrated analysis is required may be determined based on the analysis result of the first anonymized log.

Moreover, the analysis device according to a third aspect depending from the first or second aspect may further include: a transmission destination determiner that determines a transmission destination according to a result of the integrated analysis; and a transmitter that transmits the report information indicating the result of the integrated analysis to the transmission destination determined by the transmission destination determiner.

Accordingly, since the report information is transmitted to the transmission destination according to the result of the integrated analysis, the result of the integrated analysis can be informed to an appropriate transmission destination. That is, according to the range affected by the situation of a device to be monitored, the result of the integrated analysis can be informed to, for example, a SIRT (Security Incident Response Team) corresponding to the range.

Moreover, in the analysis device according to a fourth aspect depending from any one of the first to third aspects, the system cooperator may obtain the second anonymized log to be integrated from one or more second anonymized logs corresponding to at least one of a type or a time slot determined according to the first anonymized log, among the plurality of second anonymized logs. Alternatively, in the analysis device according to a fifth aspect depending from any one of the first to third aspects, the system cooperator may specify, from the plurality of second anonymized logs, a second anonymized log that matches a condition determined according to the first anonymized log by using at least one of a type or a time slot, so as to obtain the second anonymized log as the second anonymized log to be integrated.

Accordingly, the type and the time slot of the obtained second anonymized log to be integrated can be limited to the type and the time slot that are determined according to the first anonymized log. For example, when the device to be monitored is a vehicle, the second anonymized log to be integrated of a type regarding traffic jam prediction, or the second anonymized log to be integrated corresponding to a time slot of traffic jam can be obtained. As a result, since the type and the time slot of the second anonymized log to be integrated are limited, it is possible to inhibit obtaining of a second anonymized log with low contribution to integrated analysis, and to realize efficient integrated analysis.

Moreover, in the analysis device according to the sixth aspect depending from any one of the first to fifth aspects, the system cooperator may further anonymize the specific second anonymized data included in the second anonymized log to be integrated that has been obtained.

That is, the second anonymized log to be integrated or the specific second anonymized data is reanonymized. Accordingly, the confidentiality of those log and data can be increased. Namely, it is possible to inhibit that the cooperative monitoring system recognizes, from those reanonymized log or data, a device corresponding to the log. As a result, the safety of the second anonymized log to be integrated can be increased.

Moreover, in the analysis device according to a seventh aspect depending from any one of the first to sixth aspects, the system cooperator may further transmit the first anonymized log to the cooperative monitoring system, according to a request from the cooperative monitoring system.

Accordingly, not only the analysis device but also the cooperative monitoring system can obtain the first anonymized log and the second anonymized log corresponding to the mutually same device to be monitored and can perform integrated analysis. That is, mutual cooperation between the system including the analysis device and the cooperative monitoring system can be realized, and effective analysis of the logs can be performed.

Moreover, in the analysis device according to an eighth aspect depending from any one of the first to seventh aspects, the linking resolution unit may further: store, in a recording medium, linking information indicating association between the first anonymized data and the specific second anonymized data; and when repeatedly performing the linking resolution for the first anonymized data, perform the linking resolution by referring to the linking information stored in the recording medium.

Accordingly, when the linking resolution is repeatedly performed, since the linking resolution is performed with reference to the linking information, the time and effort for the analysis device to communicate with another device or the like to perform the linking resolution can be saved. As a result, efficient linking resolution and integrated analysis can be realized.

Moreover, in the analysis device according to a ninth aspect depending from the eighth aspect, the linking resolution unit may further: set an expiration date to the linking information, and when a timing of repeatedly performing the linking resolution for the first anonymized data has not passed the expiration date, perform the linking resolution by referring to the linking information stored in the recording medium.

Accordingly, since the expiration date is set to the linking information, the corresponding relationship between the first anonymized data and the second anonymized data can be guaranteed until the expiration date, and the corresponding relationship can be changed after the expiration date. That is, after the expiration date, the respective modes for anonymization of the system including the analysis device and the cooperative monitoring system can be changed. As a result, the flexibility of overall processing operations of these systems can be increased.

Moreover, in the analysis device according to a tenth aspect depending from the eighth or ninth aspect, the system cooperator may further transmit the linking information stored in the recording medium to the cooperative monitoring system.

Accordingly, since the linking information is transmitted to the cooperative monitoring system, the cooperative monitoring system can perform the linking resolution by using the linking information. As a result, the cooperative monitoring system can also perform the integrated analysis as in the analysis device.

Moreover, in the analysis device according to an eleventh aspect depending from the tenth aspect, when the linking information stored in the recording medium is updated by the linking resolution unit, the system cooperator may further transmit the linking information that has been updated to the cooperative monitoring system.

Accordingly, the analysis device and the cooperative monitoring system can synchronize and manage common linking information. As a result, it is possible to improve the efficiency of the integrated analysis performed by the analysis device and the cooperative monitoring system.

Moreover, in the analysis device according to a twelfth aspect depending from any one of the first to eleventh aspects, the obtainer may obtain the first anonymized log from a first server, the first server may anonymize, when a first log regarding the device to be monitored is obtained, first identification data of the device to be monitored included in the first log, so as to generate the first anonymized log including the first anonymized data, a second server included in the cooperative monitoring system may anonymize, when a second log regarding the device to be monitored is obtained, second identification data included in the second log, so as to generate the second anonymized log including the second anonymized data, and the linking resolution unit may perform the linking resolution by transmitting the first anonymized data to the first server and performing a query for second anonymized data corresponding to the first anonymized data to the second server via the first server.

Accordingly, since the first server and the second server each perform anonymization, and the linking resolution is performed by the query to the second server via the first server, accurate linking resolution can be realized.

Hereinafter, an embodiment will be described in detail with reference to the drawings.

Note that the embodiment described below illustrates a general or specific example. Therefore, numerical values, shapes, materials, structural elements, the arrangement and connection of the structural elements, steps, the order of the steps, etc., shown in the following embodiment are mere examples, and are not intended to limit the scope of the present disclosure.

Note that the figures are schematic illustrations and are not necessarily precise depictions. Moreover, in the figures, structural elements that are essentially the same share like reference signs.

Embodiment

FIG. 1 is a general configuration diagram of an analysis system in the present embodiment.

Analysis system 1 in the present embodiment is a system that analyzes and monitors processing operations in vehicle V, which is a device to be monitored, and includes vehicle V, base station R, first system 100, and second system 200. Note that base station R need not be included in analysis system 1.

Vehicle V includes equipment that receives services of telematics such as equipment used for a car navigation system, and performs vehicle control such as steering and vehicle speed. Additionally, vehicle V transmits a plurality of logs to first system 100 and second system 200 via base station R. These logs include a log regarding telematics, a log regarding vehicle control, and the like. In addition, each log includes privacy information. The privacy information is, for example, identification data for identifying vehicle V, and is, for example, a VIN (Vehicle Identification Number), an IP (Internet Protocol) address, and the like. Note that these logs may be called vehicle data.

First system 100 is also called, for example, a vehicle monitoring system, and monitors the vehicle control of each vehicle including vehicle V. Such first system 100 includes first server 110 and first analysis device 120.

First server 110 is also called, for example, a vehicle log server, and receives a first log according to the analysis purpose of first system 100, among the logs transmitted from each vehicle including vehicle V. For example, the first log is a log regarding the vehicle control of vehicle V. First server 110 generates a first anonymized log by anonymizing the first log, and outputs the first anonymized log to first analysis device 120. Specifically, in the anonymization of the first log, first server 110 generates first anonymized data by anonymizing first identification data included in the first log. It can be said that the first anonymized log is the first log including the first anonymized data instead of the first identification data. The first identification data is, for example, a VIN for identifying vehicle V. Note that, since the anonymization is performed in the present embodiment, equipment other than first server 110 cannot identify vehicle V from the first anonymized data and the first anonymized log. Such anonymization is performed for privacy information protection required by the GDPR (General Data Protection Regulation) and the like.

First analysis device 120 is a device used in an SOC (Security Operation Center) for vehicle control, and when one or more first anonymized logs are obtained from first server 110, first analysis device 120 analyzes those first anonymized logs. For example, first analysis device 120 determines whether or not there is an attack on a vehicle corresponding to the first anonymized data, and the like, by analyzing those first anonymized logs.

Second system 200 is also called, for example, an IT (Information Technology) system, and monitors the telematics service of each vehicle including vehicle V. Such second system 200 includes second server 210 and second analysis device 220.

Second server 210 is also called, for example, a telematics server, and receives a second log according to the analysis purpose of second system 200, among the logs transmitted from each vehicle including vehicle V. For example, the second log is a log regarding telematics such as a car navigation system. Second server 210 generates a second anonymized log by anonymizing the second log, and outputs the second anonymized log to second analysis device 220. Specifically, in the anonymization of the second log, second server 210 generates second anonymized data by anonymizing second identification data included in the second log. It can be said that the second anonymized log is the second log including the second anonymized data instead of the second identification data. The second identification data is, for example, an IP address for identifying vehicle V. Note that, since the anonymization is performed in the present embodiment, equipment other than second server 210 cannot identify vehicle V from the second anonymized data and the second anonymized log. Such anonymization is performed for privacy information protection required by the GDPR and the like, as in first server 110.

Second analysis device 220 is a device used in an SOC for IT, and when one or more second anonymized logs are obtained from second server 210, second analysis device 220 analyzes those second anonymized logs. For example, second analysis device 220 predicts traffic jam on a road on which the vehicle corresponding to the second anonymized data is scheduled to travel, by analyzing those second anonymized logs.

Note that, although the first identification data and the second identification data are included in the first log and the second log, respectively, data obtained by anonymizing the second identification data may or may not be included in the first anonymized log. Similarly, data obtained by anonymizing the first identification data may or need not be included in the second anonymized log. In addition, first server 110 and second server 210 are devices operated by, for example, a vehicle manufacturer, and first analysis device 120 and second analysis device 220 are devices operated by an organization that provides services, or the like.

Here, when integrated analysis is required, first analysis device 120 in the present embodiment obtains one or more second anonymized logs of vehicle V from second analysis device 220, and integrates the one or more second anonymized logs of vehicle V to one or more first anonymized logs of vehicle V. Then, first analysis device 120 performs, as integrated analysis, analysis of those integrated one or more first anonymized logs and one or more second anonymized logs. In addition, when performing this integrated analysis, first analysis device 120 performs linking resolution, which is processing for linking the first anonymized log and the second anonymized log regarding vehicle V.

Note that, in the present embodiment, although first server 110 and second server 210 obtain the logs of vehicle V from vehicle V via base station R, they may obtain the logs of vehicle V from a device or a server other than vehicle V. That is, the logs of vehicle V in the present embodiment are logs regarding vehicle V, and are not limited to the logs generated by vehicle V, or the logs obtained from vehicle V. Accordingly, the logs of vehicle V may include a log generated by another device or server, such as a communication log between vehicle V and an external network, or a log obtained by another device or server.

Figure 2:
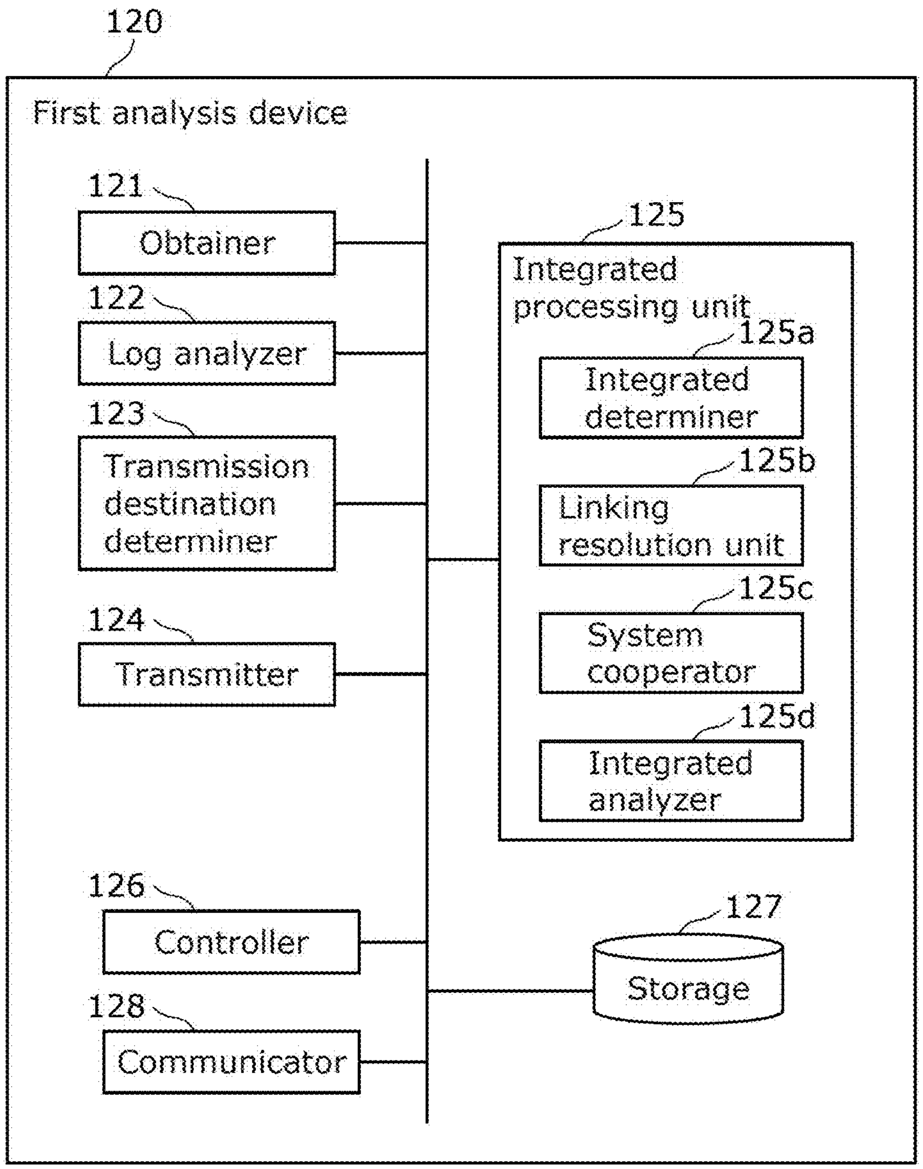
FIG. 2 is a block diagram illustrating an example of the functional configuration of a first analysis device in the embodiment.

FIG. 2 is a block diagram illustrating an example of the functional configuration of first analysis device 120 in the present embodiment.

First analysis device 120 in the present embodiment is a device that transmits report information based on an analysis result of a log regarding vehicle V, which is a device to be monitored. Such first analysis device 120 includes obtainer 121, log analyzer 122, transmission destination determiner 123, transmitter 124, integrated processing unit 125, controller 126, storage 127, and communicator 128.

Communicator 128 communicates with each of first server 110 and second analysis device 220 via a telecommunication line such as the Internet.

Obtainer 121 obtains the first anonymized log of vehicle V from first server 110 via communicator 128. That is, obtainer 121 obtains, from first server 110, the first anonymized log, which is the log including the first anonymized data of vehicle V, which is the device to be monitored. Then, obtainer 121 stores the first anonymized log in storage 127.

Log analyzer 122 analyzes one or more first anonymized logs that are obtained by obtainer 121 and stored in storage 127.

Transmission destination determiner 123 determines a transmission destination of report information that indicates an analysis result of one or more logs of vehicle V. That is, transmission destination determiner 123 determines the transmission destination of the report information that indicates the result of analysis of the one or more first anonymized logs by log analyzer 122. Alternatively, transmission destination determiner 123 determines the transmission destination of the report information that indicates a result of integrated analysis by integrated processing unit 125. For example, transmission destination determiner 123 determines the transmission destination of the report information, according to the result of the integrated analysis. The transmission destination is, for example, at least one SIRT (Security Incident Response Team) of a plurality of kinds of SIRTs. Specifically, the plurality of kinds of SIRTs include a first SIRT that is a SIRT responsible for vehicle control, and a second SIRT that is a SIRT responsible for vehicle control and telematics.

Transmitter 124 transmits the report information to the transmission destination determined by transmission destination determiner 123 via communicator 128. For example, when the integrated analysis is performed, transmitter 124 transmits the report information that indicates the result of the integrated analysis to the transmission destination according to the result of the integrated analysis, that is, the transmission destination determined by transmission destination determiner 123. Note that the transmission destination is the above-described SIRT, and is specifically a device or a system included in the SIRT.

Integrated processing unit 125 performs the above-described integrated analysis. Specifically, this integrated processing unit 125 includes integrated determiner 125*a*, linking resolution unit 125*b*, system cooperator 125*c*, and integrated analyzer 125*d*.

Integrated determiner 125*a* determines whether or not integrated analysis is required based on the analysis result by log analyzer 122, that is, the analysis result of the one or more first anonymized logs.

Linking resolution unit 125*b* performs linking resolution, when it is determined by integrated determiner 125*a* that integrated analysis is required. The linking resolution is processing for linking the first anonymized log and the second anonymized log each regarding the same vehicle V. Specifically, second analysis device 220 of second system 200 has a plurality of second anonymized logs obtained from each vehicle including vehicle V. Not only the second anonymized log of vehicle V but also second anonymized logs of other vehicles are included in the plurality of second anonymized logs. Therefore, linking resolution unit 125*b* performs the linking resolution for linking the second anonymized log, which is a log of vehicle V similarly to the first anonymized log among the plurality of second anonymized logs, to the first anonymized log. That is, linking resolution unit 125*b* performs the linking resolution, which is processing for determining, from the second anonymized data included in each of the plurality of second anonymized logs included in second system 200, which is the cooperative monitoring system, the second anonymized data corresponding to first anonymized data as specific second anonymized data. Accordingly, the first anonymized data and the specific second anonymized data are linked to each other, and as a result, the first anonymized log including the first anonymized data and the second anonymized log including the specific second anonymized data are linked to each other.

System cooperator 125*c* requests and obtains the second anonymized log linked to the first anonymized log, from second analysis device 220 via communicator 128. The second anonymized log is the log used for integration into the first anonymized log. That is, system cooperator 125*c* obtains, from second system 200 (that is, the cooperative monitoring system), the second anonymized log including the above-described specific second anonymized data as the second anonymized log to be integrated.

Integrated analyzer 125*d* integrates the one or more first anonymized logs and the one or more second anonymized logs to be integrated, and performs analysis of the integrated one or more first anonymized logs and one or more second anonymized logs to be integrated. That is, integrated analyzer 125*d* performs analysis of a log group including the first anonymized logs and the second anonymized logs to be integrated as the integrated analysis.

Controller 126 controls each of components included in first analysis device 120. That is, controller 126 controls obtainer 121, log analyzer 122, transmission destination determiner 123, transmitter 124, integrated processing unit 125, storage 127, and communicator 128.

Storage 127 is a recording medium for storing data, information, and the like that are generated by each of the above-described components. For example, storage 127 is a hard disk drive, a RAM (Random Access Memory), a ROM (Read Only Memory), a semiconductor memory, or the like. Note that such storage 127 may be volatile or may be non-volatile.

Figure 3:
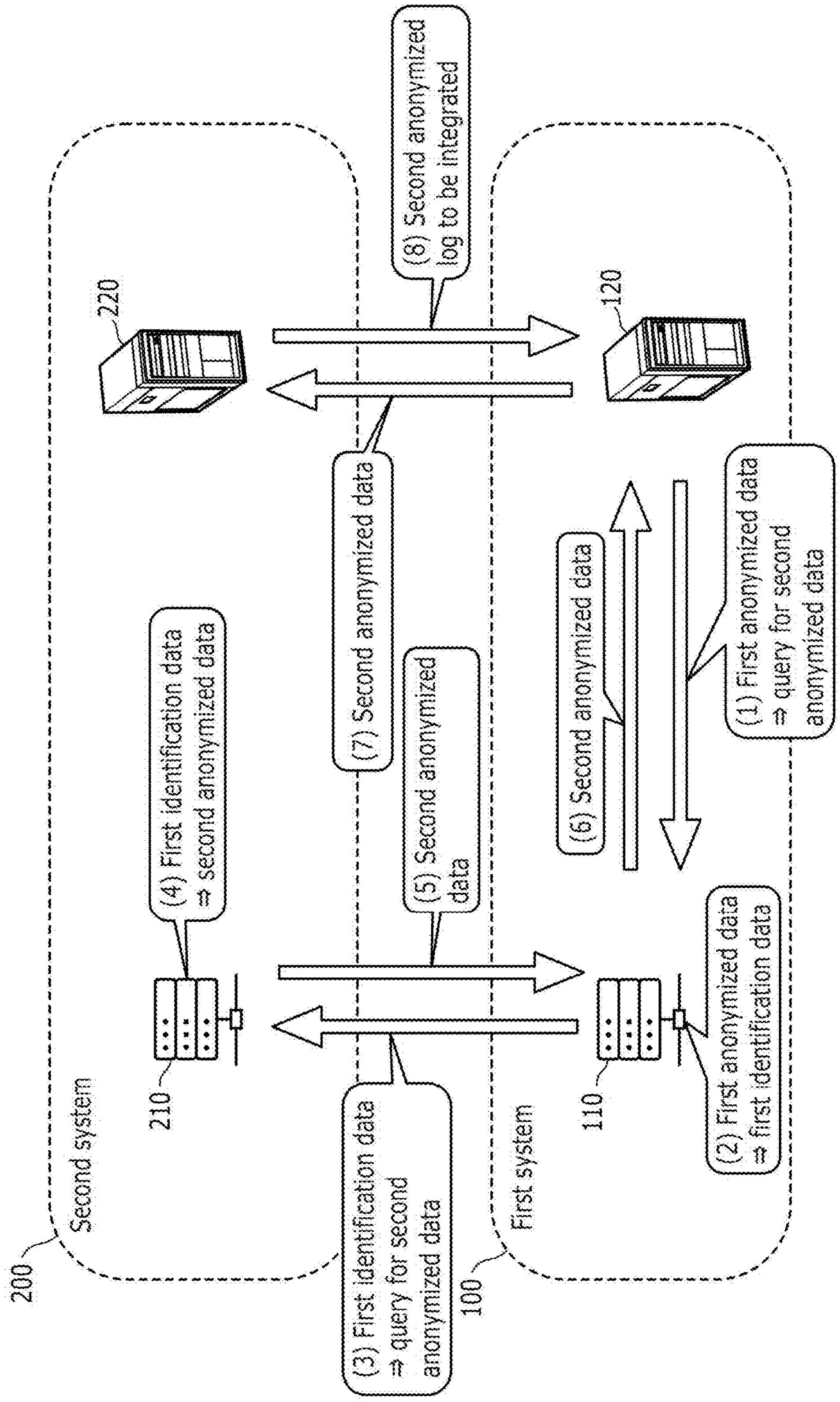
FIG. 3 is a diagram for describing processing operations regarding an integrated processing unit of the processing of a first system and a second system.

FIG. 3 is a diagram for describing processing operations regarding integrated processing unit 125 of the processing of first system 100 and second system 200.

When it is determined by integrated determiner 125*a* that integrated analysis is required, linking resolution unit 125*b* of integrated processing unit 125 performs query from communicator 128 to second server 210 via first server 110, as in processing (1) in FIG. 3. The query is a query for the second anonymized data corresponding to the first anonymized data. At this time, linking resolution unit 125*b* transmits the first anonymized data to first server 110 via communicator 128.

As in processing (2) in FIG. 3, when the first anonymized data is obtained from linking resolution unit 125*b*, first server 110 identifies the first identification data corresponding to the first anonymized data. Note that, when first server 110 first transmits the above-described first log to first analysis device 120, since first server 110 has generated the first anonymized data by anonymizing the first identification data included in the first log, first server 110 can identify the first identification data corresponding to the first anonymized data. Then, as in processing (3) in FIG. 3, first server 110 transmits the identified first identification data to second server 210, and queries the second anonymized data corresponding to the first identification data.

When second server 210 obtains the first identification data from first server 110 and accepts the above-described query, second server 210 identifies the second anonymized data corresponding to the first identification data, as in processing (4) in FIG. 3. Note that when second server 210 first transmits the above-described second log to second analysis device 220, second server 210 obtains the second log including the first identification data and the second identification data, and generates the second anonymized data by anonymizing the second identification data. Accordingly, second server 210 can identify the second anonymized data corresponding to the first identification data. Then, as in processing (5) in FIG. 3, second server 210 answers to the query from first server 110 by transmitting the identified second anonymized data to first server 110. Note that second server 210 may separately hold data for identifying the second identification data corresponding to the first identification data, identify the second identification data corresponding to the first identification data, and further identify the second anonymized data corresponding to the second identification data.

When first server 110 receives the second anonymized data from second server 210, first server 110 transmits the second anonymized data to first analysis device 120, as in processing (6) in FIG. 3. Accordingly, linking resolution unit 125*b* receives the second anonymized data via, for example, communicator 128 as the response to the query in the processing (1) in FIG. 3. This second anonymized data is the data corresponding to the first anonymized data, and is the data for identifying the same vehicle V as the first anonymized data. Linking resolution unit 125*b* outputs the second anonymized data to system cooperator 125*c*.

When system cooperator 125*c* obtains the second anonymized data from linking resolution unit 125*b*, system cooperator 125*c* transmits the second anonymized data to second analysis device 220, so as to request the second anonymized log including the second anonymized data from second analysis device 220, as in processing (7) in FIG. 3.

When second analysis device 220 receives the second anonymized data from system cooperator 125*c*, and further accepts the above-described request, second analysis device 220 transmits the second anonymized log including the second anonymized data to first analysis device 120 as a second anonymized log to be integrated, as in processing (8) in FIG. 3.

When system cooperator 125*c* of first analysis device 120 obtains the second anonymized log to be integrated from second analysis device 220 via communicator 128, system cooperator 125*c* stores the second anonymized log to be integrated in storage 127.

Then, integrated analyzer 125*d* of first analysis device 120 integrates one or more first anonymized logs and one or more second anonymized logs to be integrated that are stored in storage 127, so as to generate a log group including the one or more first anonymized logs and the one or more second anonymized logs to be integrated. Furthermore, integrated analyzer 125*d* performs analysis of the log group as integrated analysis, generates report information indicating a result of the integrated analysis, and stores the report information in storage 127. This report information is transmitted to the transmission destination determined by transmission destination determiner 123 via transmitter 124.

In this manner, in the present embodiment, first analysis device 120 performs linking resolution by performing the query. Specifically, in the present embodiment, obtainer 121 of first analysis device 120 obtains the first anonymized log from vehicle V via first server 110 and communicator 128. Note that vehicle V is the device to be monitored. When first server 110 obtains the first log regarding vehicle V, first server 110 generates the first anonymized log including the first anonymized data by anonymizing the first identification data of vehicle V included in the first log. When second server 210 included in the cooperative monitoring system, which is second system 200, obtains the second log regarding vehicle V, second server 210 generates the second anonymized log including the second anonymized data by anonymizing the second identification data included in the second log. Then, linking resolution unit 125*b* of first analysis device 120 transmits the first anonymized data to first server 110 via communicator 128. Furthermore, linking resolution unit 125*b* performs linking resolution by performing a query for the second anonymized data corresponding to the first anonymized data to second server 210 via communicator 128 and first server 110.

Accordingly, since each of first server 110 and second server 210 performs anonymization, and the linking resolution is performed by the query to second server 210 via first server 110, accurate linking resolution can be realized.

Figure 4:
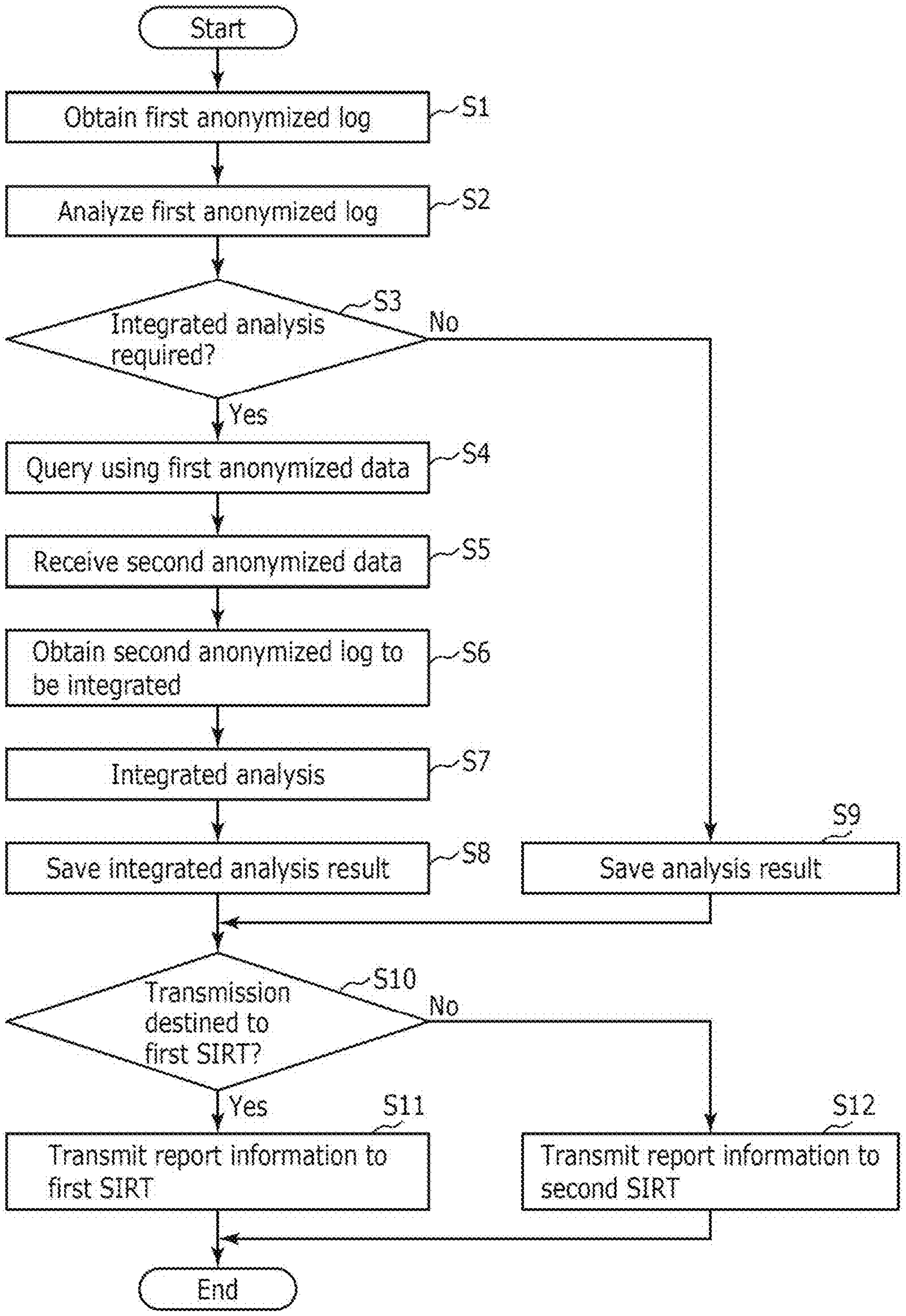
FIG. 4 is a flowchart illustrating an example of processing operations of the first analysis device in the embodiment.

FIG. 4 is a flowchart illustrating an example of processing operations of first analysis device 120 in the present embodiment.

First, obtainer 121 of first analysis device 120 obtains one or more first anonymized logs from first server 110 (step S1). Then, log analyzer 122 analyzes the one or more first anonymized logs (step S2).

Integrated determiner 125*a* of integrated processing unit 125 determines whether or not integrated analysis is required, based on an analysis result of the one or more first anonymized logs (step S3). For example, when the analysis result indicates an attack relevant to a network outside vehicle V, integrated determiner 125*a* determines that the integrated analysis is required. An example of the attack is an attack to vehicle V via an Out-Car system to be monitored. Alternatively, an example of the attack is an attack from vehicle V to another device via the Out-Car system to be monitored. Alternatively, an example of the attack may be an attack the source or destination of which is vehicle V when seen from the Out-Car system.

Here, when it is determined by integrated determiner 125*a* that the integrated analysis is required (Yes in step S3), linking resolution unit 125*b* performs a query using the first anonymized data (step S4). Note that, in step S4, linking resolution unit 125*b* may use, in addition to the first anonymized data, information used as a parameter for anonymization processing. That is, not only the first anonymized data but also the information may be used, or the information may be used instead of the first anonymized data. The anonymization processing is processing for obtaining the first anonymized data by anonymizing the first identification data (a specific example is a VIN). The information used as the parameter for such anonymization processing may be time information indicating the time at which the first anonymized log including the first anonymized data is generated, or may be position information indicating the position of vehicle V at the time.

On the other hand, when it is determined by integrated determiner 125*a* that the integrated analysis is not required (No in step S3), log analyzer 122 saves, in storage 127, the analysis result of the one or more first anonymized logs obtained by the processing in step S2 (step S9). That is, log analyzer 122 saves the report information indicating the analysis result in storage 127.

After the processing in step S4, linking resolution unit 125*b* receives the second anonymized data (that is, the specific second anonymized data) corresponding to the first anonymized data as a result of the query, which is the processing in step S4 (step S5).

System cooperator 125*c* obtains, from second analysis device 220, the second anonymized log including the second anonymized data received in step S5 as the second anonymized log to be integrated (step S6). The second anonymized log to be integrated is stored in storage 127.

Next, integrated analyzer 125*d* generates a log group by integrating the one or more first anonymized logs and the one or more second anonymized logs to be integrated, and performs analysis of the log group as the integrated analysis (step S7). Then, integrated analyzer 125*d* saves, in storage 127, a result of the integrated analysis obtained by the processing in step S7 (step S8). That is, integrated analyzer 125*d* saves the report information indicating the result of the integrated analysis in storage 127.

When the report information is saved in storage 127 by the processing in step S8 or the processing in step S9, transmission destination determiner 123 determines whether or not the transmission destination of the report information is the first SIRT (step S10). Specifically, transmission destination determiner 123 determines whether the analysis result indicated by the report information relates only to the vehicle, or relates not only to the vehicle but also to IT or telematics. When transmission destination determiner 123 determines that the analysis result relates only to the vehicle, transmission destination determiner 123 determines the first SIRT as the transmission destination of the report information, and when transmission destination determiner 123 determines that the analysis result relates to the vehicle and IT or telematics, transmission destination determiner 123 determines the second SIRT as the transmission destination of the report information. That is, according to the range affected by the situation of the device to be monitored, which is vehicle V, for example, a SIRT corresponding to the range is determined as the transmission destination. When the range affected is limited to the vehicle only, the first SIRT responsible for a limited range is determined to be the transmission destination, and when the range affected is not limited to the vehicle only, but also affects IT or telematics, the second SIRT responsible for a wide range is determined to be the transmission destination.

When it is determined by transmission destination determiner 123 that the transmission destination of the report information is the first SIRT (Yes in step S10), transmitter 124 transmits the report information to the first SIRT via communicator 128 (step S11). On the other hand, when it is determined by transmission destination determiner 123 that the transmission destination of the report information is not the first SIRT (No in step S10), transmitter 124 transmits the report information to the second SIRT via communicator 128 (step S12).

As described above, in first analysis device 120 in the present embodiment, the second anonymized data corresponding to the first anonymized data is determined as the specific second anonymized data by the linking resolution. That is, the second anonymized data corresponding to the same vehicle V as the first anonymized data is determined as the specific second anonymized data, and is linked to the first anonymized data. Accordingly, the second anonymized log regarding the same vehicle V as the first anonymized log can be obtained from second system 200 as the second anonymized log to be integrated. As a result, since the integrated analysis can be performed on the first anonymized log and the second anonymized log to be integrated regarding the same vehicle V, the analysis accuracy can be more improved than the analysis using only the first anonymized log. That is, even when anonymization is performed on logs in mutually different modes in first system 100 and second system 200, the logs regarding the same vehicle V can be integrated and analyzed, and as a result, the analysis accuracy can be improved.

In addition, in the present embodiment, since the linking resolution is performed when it is determined that the integrated analysis is required, it is possible to inhibit the linking resolution from being performed also in a case where the integrated analysis is not required, and the processing burden can be reduced. In addition, when the integrated analysis is not required, analysis of the first anonymized log can be performed without using the second anonymized log, and the processing burden can be reduced.

In addition, in the present embodiment, since the report information is transmitted to the transmission destination according to the result of the integrated analysis, the result of the integrated analysis can be informed to an appropriate transmission destination. That is, according to the range affected by the situation of vehicle V, the result of the integrated analysis can be informed to a SIRT corresponding to the range.

Note that, in the present embodiment, although transmission destination determiner 123 determines whether the transmission destination of the report information is the first SIRT or the second SIRT in step S10, both the first SIRT and the second SIRT may be determined as transmission destinations, according to the analysis result indicated in the report information. In this case, transmitter 124 transmits the report information to both the first SIRT and the second SIRT.

Variation 1

In the above-described embodiment, as in the processing (7) in FIG. 3, system cooperator 125*c* transmits the second anonymized data to second analysis device 220, so as to request the second anonymized log including the second anonymized data from second analysis device 220. At this time, in the present variation, system cooperator 125*c* transmits not only the second anonymized data but also log condition information to second analysis device 220.

Figure 5:
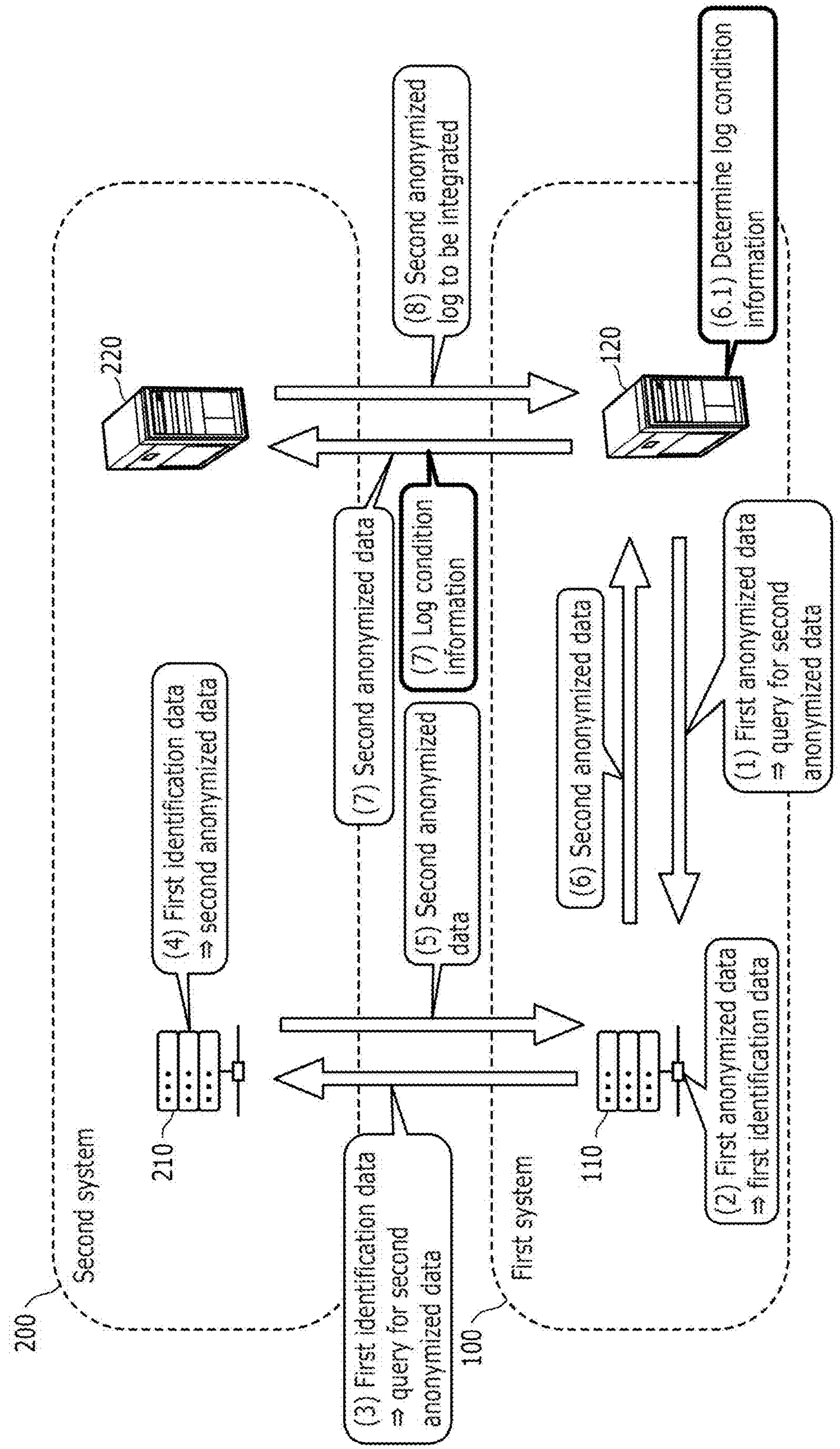
FIG. 5 is a diagram for describing processing operations regarding the integrated processing unit of the processing of a first system and a second system in Variation 1 of the embodiment.

FIG. 5 is a diagram for describing processing operations regarding integrated processing unit 125 of the processing of first system 100 and second system 200.

Also in the present variation, first system 100 and second system 200 perform processing (1) to (6) in FIG. 5, similarly to the processing (1) to (6) in FIG. 3. Then, when system cooperator 125*c* obtains the second anonymized data from first server 110 via communicator 128 by processing (6) in FIG. 5, system cooperator 125*c* determines log condition information as in processing (6.1) in FIG. 5. The log condition information is information indicating the condition of the second anonymized log. For example, system cooperator 125*c* may determine the log condition information based on the analysis result of the one or more first anonymized logs by log analyzer 122. The condition indicated by the log condition information may be specifically the type (hereinafter also called the log type) of the second anonymized log to be integrated, or may be a record time slot of the second anonymized log to be integrated. In addition, the log condition information may indicate a timestamp as a condition.

Then, system cooperator 125*c* transmits not only the second anonymized data but also the log condition information to second analysis device 220 via communicator 128, as in processing (7) in FIG. 5. That is, system cooperator 125*c* requests, from second analysis device 220, the second anonymized log that includes the second anonymized data and that satisfies the condition indicated by the log condition information. As a result, system cooperator 125*c* obtains, from second analysis device 220 via communicator 128, the second anonymized log in response to the request as the second anonymized log to be integrated, as in processing (8) in FIG. 5.

Figure 6:
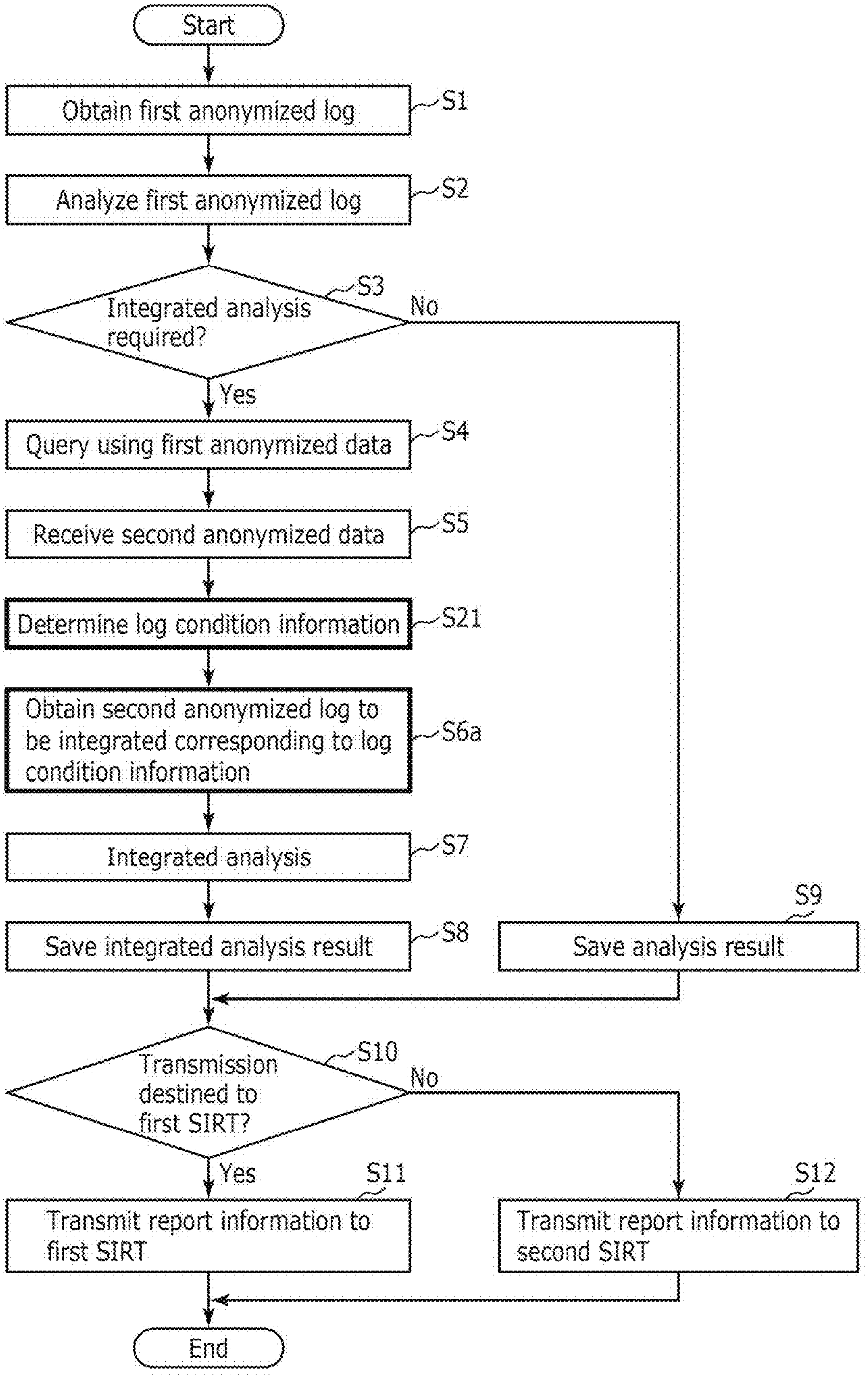
FIG. 6 is a flowchart indicating an example of processing operations of a first analysis device in Variation 1 of the embodiment.

FIG. 6 is a flowchart indicating an example of processing operations of first analysis device 120 in the present variation.

First analysis device 120 in the present variation performs the processing in steps S1 to S5, similarly to the flowchart illustrated in FIG. 4 of the above-described embodiment. After the processing in step S5, system cooperator 125*c* determines the log condition information (step S21). Then, system cooperator 125*c* obtains, from second analysis device 220, the second anonymized log that includes the second anonymized data received in step S5, and that satisfies the condition indicated in the log condition information as the second anonymized log to be integrated (step S6*a*).

Then, first analysis device 120 performs the processing in steps S7 to S12, similarly to the flowchart illustrated in FIG. 4 of the above-described embodiment.

In this manner, in the present variation, system cooperator 125*c* obtains the second anonymized log to be integrated from one or more second anonymized logs that satisfy the condition determined according to the first anonymized log, among a plurality of second anonymized logs that second analysis device 220 has. Specifically, system cooperator 125*c* obtains the second anonymized log to be integrated from the one or more second anonymized logs corresponding to at least one of the log type or the time slot determined according to the first anonymized log, among the plurality of second anonymized logs. In other words, system cooperator 125*c* specifies, from the plurality of second anonymized logs, the second anonymized log that matches the condition determined according to the first anonymized log by using at least one of the type or the time slot, so as to obtain the second anonymized log as the second anonymized log to be integrated.

Accordingly, the log type and the time slot of the second anonymized log to be integrated, which is to be obtained, can be limited to the type and the time slot that are determined according to the first anonymized log. For example, the second anonymized log to be integrated of a log type regarding traffic jam prediction, or the second anonymized log to be integrated corresponding to a time slot of traffic jam can be obtained. As a result, since the log type and the time slot of the second anonymized log to be integrated are limited, it is possible to inhibit obtaining of a second anonymized log with low contribution to integrated analysis, and to realize efficient integrated analysis.

In addition, also in the present variation, in step S10, although transmission destination determiner 123 determines the first SIRT or the second SIRT as the transmission destination of the report information, transmission destination determiner 123 may determine both the first SIRT and the second SIRT as transmission destinations, according to the analysis result indicated in the report information. In this case, transmitter 124 transmits the report information to both the first SIRT and the second SIRT.

Variation 2

In the present variation, first analysis device 120 further anonymizes the second anonymized log to be integrated. In other words, first analysis device 120 performs reanonymization of the second anonymized log to be integrated. That is, anonymization of the second log to be integrated is performed twice. Accordingly, the safety of the second anonymized log to be integrated can be improved.

Figure 7:
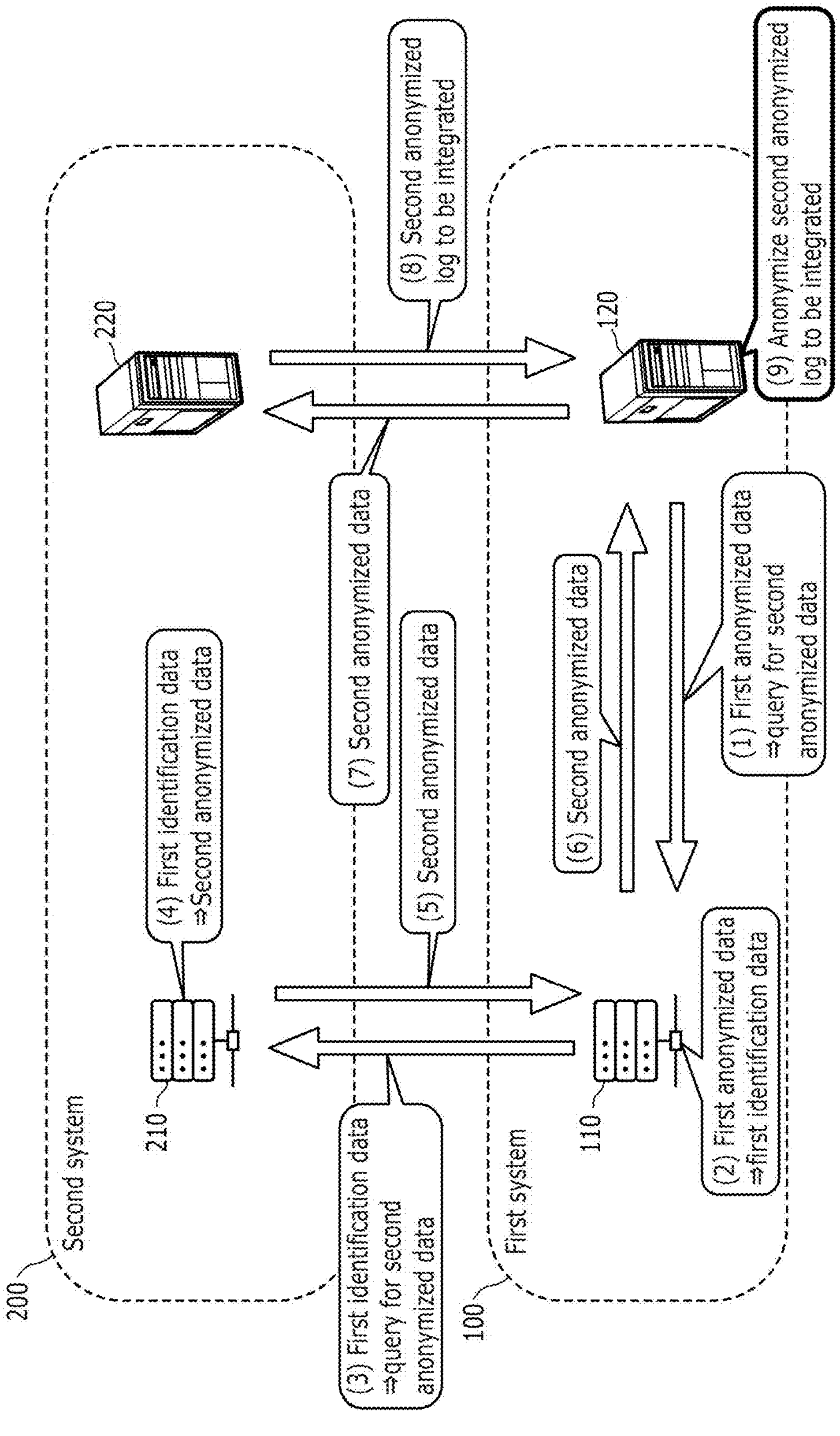
FIG. 7 is a diagram for describing processing operations regarding an integrated processing unit of the processing of a first system and a second system in Variation 2 of the embodiment.

FIG. 7 is a diagram for describing processing operations regarding integrated processing unit 125 of the processing of first system 100 and second system 200.

Also in the present variation, first system 100 and second system 200 perform processing (1) to (8) in FIG. 7, similarly to the processing (1) to (8) in FIG. 3. Then, when system cooperator 125*c* obtains the second anonymized log to be integrated from second analysis device 220 by the processing (8) in FIG. 7, system cooperator 125*c* reanonymizes the second anonymized log to be integrated, as in processing (9) in FIG. 7. That is, system cooperator 125*c* further anonymizes the second anonymized data (that is, the specific second anonymized data) included in the second anonymized log to be integrated, in other words, reanonymizes the second anonymized data. Accordingly, system cooperator 125*c* generates the second anonymized log to be integrated including the reanonymized second anonymized data. The second anonymized data is data obtained by anonymizing the second identification data such as an IP address. Accordingly, in the present variation, anonymization of the second identification data included in the second log to be integrated is performed twice.

Figure 8:
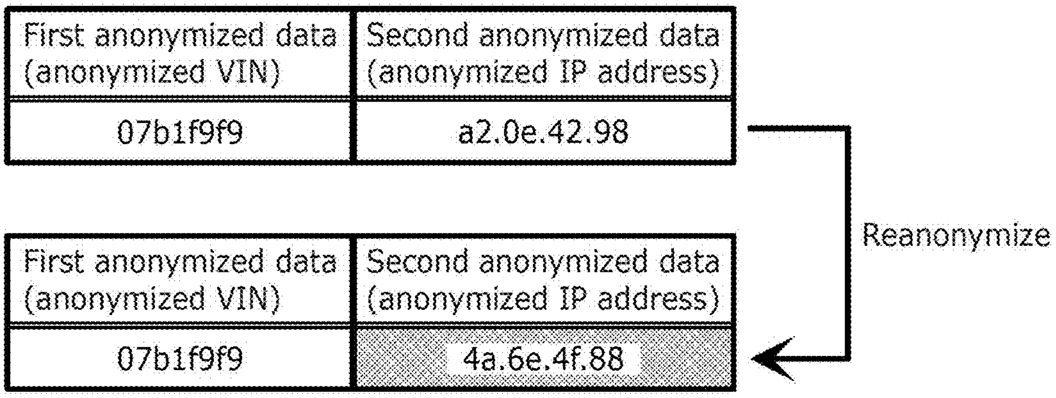
FIG. 8 is a diagram illustrating an example of reanonymization in Variation 2 of the embodiment.

FIG. 8 is a diagram illustrating an example of reanonymization.

For example, first analysis device 120 receives, from first server 110, the second anonymized data corresponding to the first anonymized data "07b1f9f9", which is an anonymized VIN or the like, by the above-described query. The second anonymized data is an anonymized IP address "a2.0e.42.98" or the like.

System cooperator 125*c* transmits the second anonymized data "a2.0e.42.98" to second analysis device 220, and requests a second anonymized log to be integrated including the second anonymized data from second analysis device 220. Then, when system cooperator 125*c* obtains the second anonymized log to be integrated from second analysis device 220, system cooperator 125*c* reanonymizes the second anonymized data "a2.0e.42.98" included in the second anonymized log to be integrated. In a specific example, system cooperator 125*c* reanonymizes the second anonymized data "a2.0e.42.98" to "4a.6e.4f.88". System cooperator 125*c* stores, in storage 127, the second anonymized log to be integrated including the second anonymized data that has been reanonymized in this manner.

Figure 9:
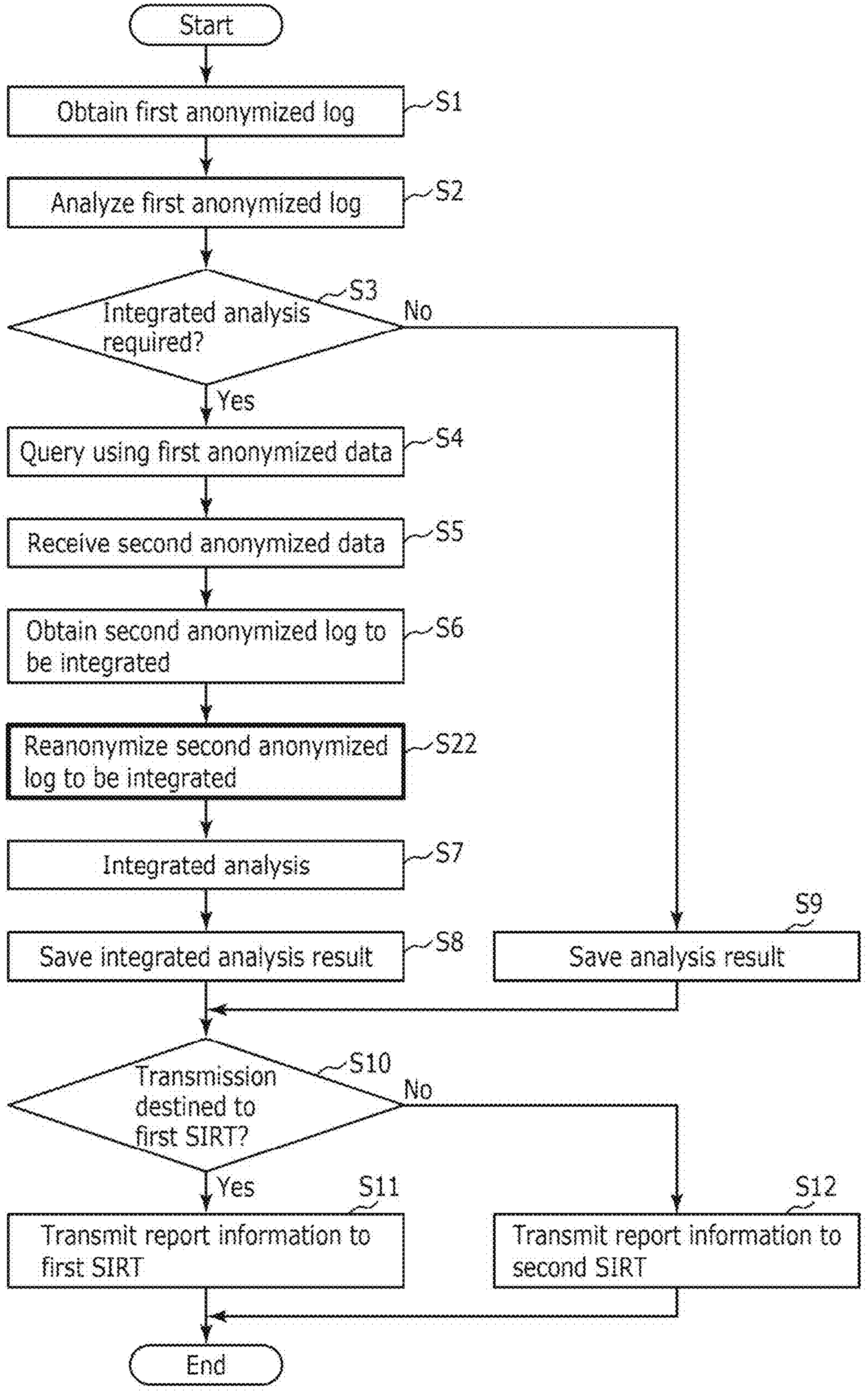
FIG. 9 is a flowchart illustrating an example of processing operations of a first analysis device in Variation 2.

FIG. 9 is a flowchart illustrating an example of processing operations of first analysis device 120 in the present variation.

First analysis device 120 in the present variation performs the processing in steps S1 to S6, similarly to the flowchart illustrated in FIG. 4 of the above-described embodiment. After the processing in step S6, system cooperator 125*c* reanonymizes and stores, in storage 127, the second anonymized log to be integrated (step S22). Next, integrated analyzer 125*d* generates a log group by integrating the one or more first anonymized logs and the one or more reanonymized second anonymized logs to be integrated, and performs analysis of the log group as the integrated analysis (step S7).

Then, first analysis device 120 performs the processing in steps S8 to S12, similarly to the flowchart illustrated in FIG. 4 of the above-described embodiment.

In this manner, in the present variation, system cooperator 125*c* anonymizes the specific second anonymized data included in the obtained second anonymized log to be integrated. Accordingly, the confidentiality of the second anonymized log to be integrated and the specific second anonymized data can be increased. Namely, it is possible to inhibit that second system 200 recognizes, from those reanonymized log or data, vehicle V corresponding to the log. As a result, the safety of the second anonymized log to be integrated can be increased.

Note that, also in the present variation, in step S10, although transmission destination determiner 123 determines the first SIRT or the second SIRT as the transmission destination of the report information, transmission destination determiner 123 may determine both the first SIRT and the second SIRT as transmission destinations, according to the analysis result indicated in the report information. In this case, transmitter 124 transmits the report information to both the first SIRT and the second SIRT.

Variation 3

In the present variation, second analysis device 220 also performs processing operations similar to those of first analysis device 120. Accordingly, first analysis device 120 in the present variation transmits the first anonymized log to second analysis device 220 in response to a request from second analysis device 220. That is, in the present variation, mutual cooperation is performed between first system 100 and second system 200.

Figure 10:
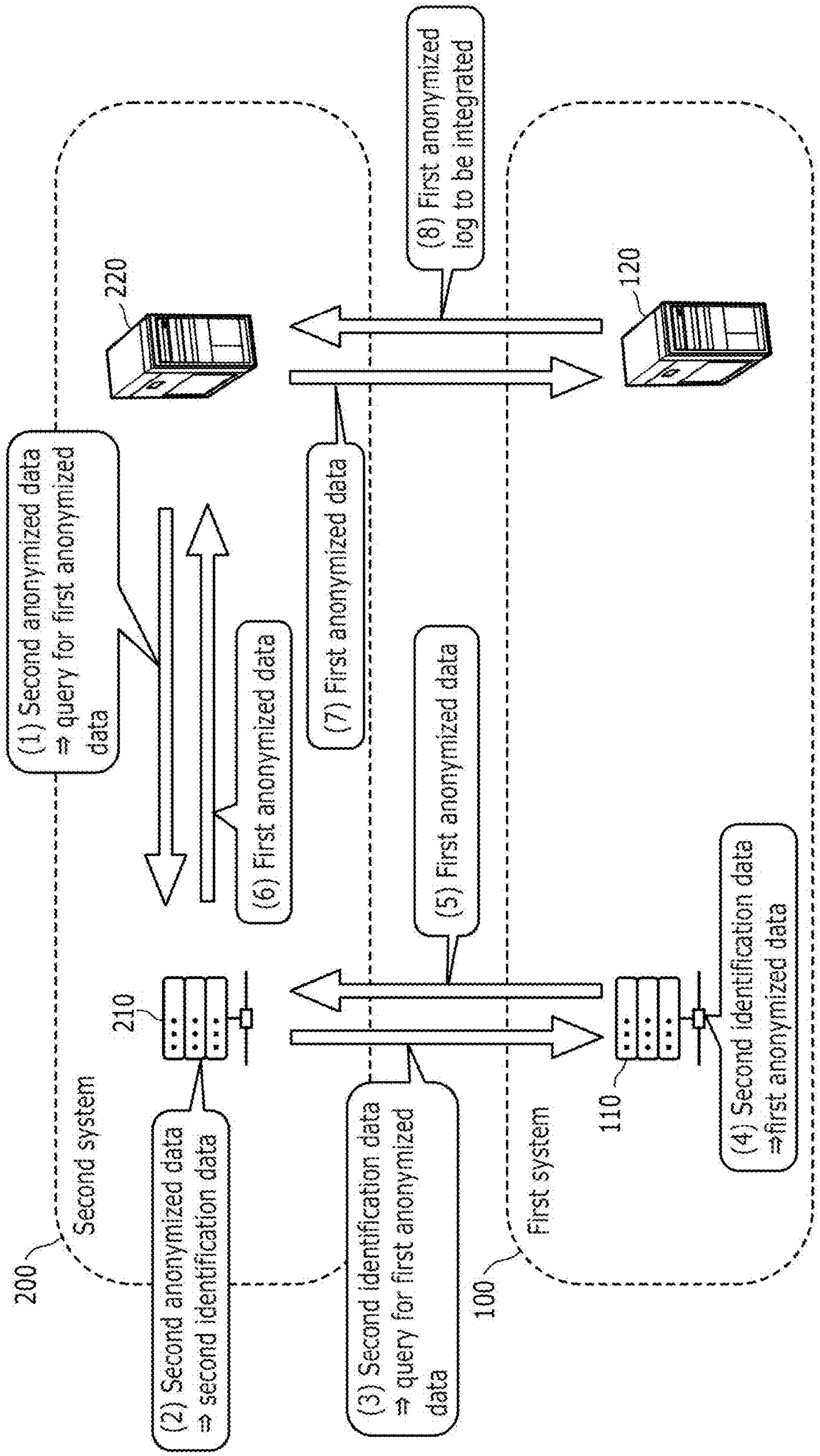
FIG. 10 is a diagram for describing processing operations regarding a second analysis device of the processing of a first system and a second system in Variation 3 of the embodiment.

FIG. 10 is a diagram for describing processing operations regarding second analysis device 220 of the processing of first system 100 and second system 200.

Second analysis device 220 performs a query to first server 110 via second server 210, as in processing (1) of FIG. 10. The query is a query for the first anonymized data corresponding to the second anonymized data. At this time, second analysis device 220 transmits the second anonymized data to second server 210.

As in processing (2) in FIG. 10, when second server 210 obtains the second anonymized data from second analysis device 220, second server 210 identifies the second identification data corresponding to the second anonymized data. Note that, when second server 210 first transmits the above-described second log to second analysis device 220, since second server 210 generates the second anonymized data by anonymizing the second identification data included in the second log, second server 210 can identify the second identification data corresponding to the second anonymized data. Then, second server 210 transmits the identified second identification data to first server 110, and queries the first anonymized data corresponding to the second identification data, as in processing (3) in FIG. 10.

When first server 110 obtains the second identification data from second server 210, and accepts the above-described query, first server 110 identifies the first anonymized data corresponding to the second identification data, as in processing (4) in FIG. 10. Note that, when first server 110 first transmits the above-described first log to first analysis device 120, first server 110 obtains the first log including the first identification data and the second identification data, and generates the first anonymized data by anonymizing the first identification data. Accordingly, first server 110 can identify the first anonymized data corresponding to the second identification data. Then, first server 110 answers to the query from second server 210 by transmitting the identified first anonymized data to second server 210, as in processing (5) of FIG. 10. Note that first server 110 may separately hold data for identifying the first identification data corresponding to the second identification data, identify the first identification data corresponding to the second identification data, and further identify the first anonymized data corresponding to the first identification data.

When second server 210 receives the first anonymized data from first server 110, second server 210 transmits the first anonymized data to second analysis device 220, as in processing (6) in FIG. 10. Accordingly, second analysis device 220 receives the first anonymized data as a response to the query in the processing (1) in FIG. 10. This first anonymized data is data that corresponds to the second anonymized data, and that is for identifying the same vehicle V as the second anonymized data.

Second analysis device 220 transmits the first anonymized data to first analysis device 120, so as to request the first anonymized log including the first anonymized data from first analysis device 120, as in processing (7) in FIG. 3.

When first analysis device 120 receives the first anonymized data from second analysis device 220, and further accepts the above-described request, first analysis device 120 transmits the first anonymized log including the first anonymized data to second analysis device 220 as the first anonymized log to be integrated, as in processing (8) in FIG. 10. That is, system cooperator 125*c* of first analysis device 120 receives the first anonymized data from second analysis device 220 via communicator 128, and transmits the first anonymized log to be integrated to second analysis device 220.

Second analysis device 220 obtains the first anonymized log to be integrated from first analysis device 120. Then, second analysis device 220 integrates the one or more first anonymized logs to be integrated and the one or more second anonymized logs, so as to generate a log group including the one or more first anonymized logs to be integrated and the one or more second anonymized logs. Then, second analysis device 220 performs analysis of the log group as the integrated analysis, and generates the report information indicating a result of the integrated analysis.

Figure 11:
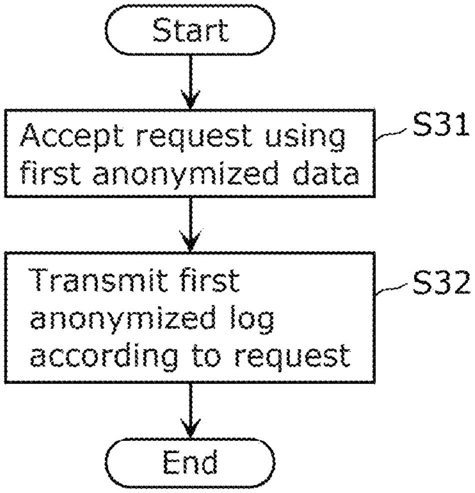
FIG. 11 is a flowchart illustrating an example of processing operations of a first analysis device in Variation 3 of the embodiment.

FIG. 11 is a flowchart illustrating an example of processing operations of first analysis device 120 in the present variation.

First analysis device 120 in the present variation further performs processing of steps S31 and S32 illustrated in FIG. 11. Specifically, controller 126 of first analysis device 120 accepts a request for the first anonymized log using the first anonymized data from second analysis device 220 via, for example, obtainer 121 (step S31). That is, controller 126 obtains the first anonymized data from second analysis device 220, and accepts the request for the first anonymized log including the first anonymized data from second analysis device 220. Then, system cooperator 125*c* extracts, according to control by controller 126, one or more first anonymized logs each including the first anonymized data, from the plurality of first anonymized logs stored in storage 127. Then, system cooperator 125*c* transmits the one or more extracted first anonymized logs to second analysis device 220 via, for example, communicator 128. That is, system cooperator 125*c* transmits the first anonymized log in response to the request from second analysis device 220 (step S32). Such a first anonymized log is handled as the first anonymized log to be integrated in second analysis device 220, and is integrated into the second anonymized log and analyzed.

In this manner, in the present variation, system cooperator 125*c* transmits the first anonymized log to second system 200, in response to the request from second system 200, which is the cooperative monitoring system. Accordingly, not only first analysis device 120 but also second analysis device 220 of second system 200 can obtain the first anonymized log and the second anonymized log corresponding to the mutually same vehicle V to perform the integrated analysis. That is, mutual cooperation between first system 100 and second system 200 can be realized, and effective analysis of the logs can be performed.

Note that, in the present variation, first analysis device 120 may transmit, instead of the one or more first anonymized logs in response to the request from second analysis device 220, the report information indicating the analysis result of the one or more first anonymized logs to second analysis device 220.

Variation 4

In the above-described embodiment, whenever first analysis device 120 determines that the integrated analysis is required, first analysis device 120 performs the above-described query for performing the linking resolution. In the present variation, first analysis device 120 holds a result of past linking resolution. Additionally, in a case where first analysis device 120 determines that the integrated analysis is required, when the result of the past linking resolution is held, first analysis device 120 uses the result of the past linking resolution without performing a query.

Figure 12:
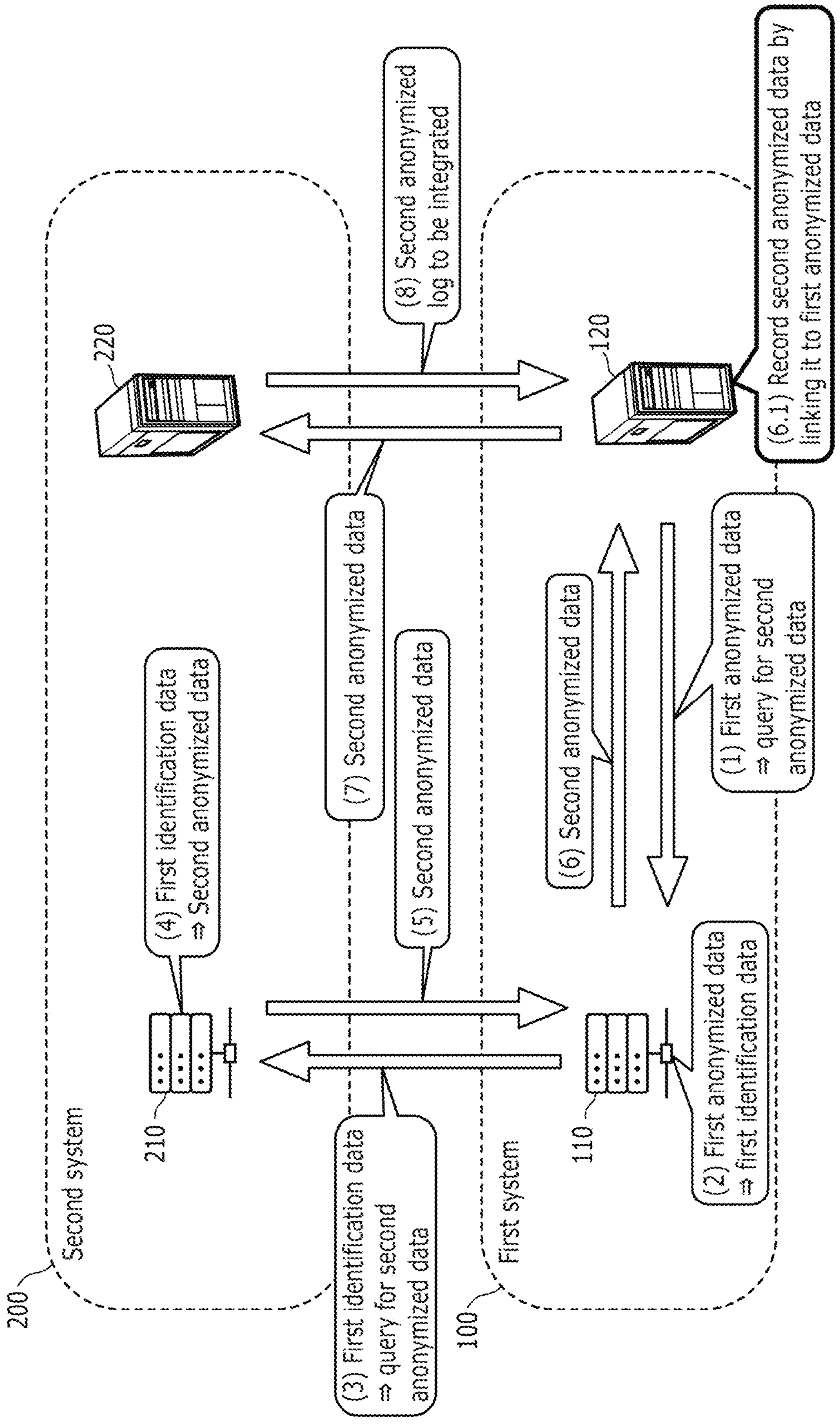
FIG. 12 is a diagram for describing processing operations regarding an integrated processing unit of the processing of a first system and a second system in Variation 4 of the embodiment.

FIG. 12 is a diagram for describing processing operations regarding integrated processing unit 125 of the processing of first system 100 and second system 200.

Also in the present variation, first system 100 and second system 200 perform processing (1) to (6) in FIG. 12, similarly to the processing (1) to (6) in FIG. 3. Additionally, when linking resolution unit 125*b* obtains the second anonymized data from first server 110 by processing (6) in FIG. 12, linking resolution unit 125*b* records the second anonymized data (that is, the specific second anonymized data) by linking it to the first anonymized data, as in processing (6.1) in FIG. 12. That is, linking resolution unit 125*b* associates the second anonymized data with the first anonymized data used in the query in the processing (1) in FIG. 12. Then, linking resolution unit 125*b* generates and stores, in storage 127, linking information indicating the first anonymized data and the second anonymized data that are associated with each other. Note that such storing of the linking information in storage 127 may be called caching.

Then, first analysis device 120 performs processing (7) and processing (8) in FIG. 12. The processing (7) and the processing (8) in FIG. 12 are similar to the processing (7) and the processing (8) in FIG. 3.

Thereafter, when it is determined again by integrated determiner 125*a* that the integrated analysis is required, linking resolution unit 125*b* of first analysis device 120 determines whether or not the linking information is stored in storage 127. That is, linking resolution unit 125*b* determines whether or not the linking information indicating the first anonymized data included in the first anonymized log, which is a target of the integrated analysis, is stored in storage 127. When linking resolution unit 125*b* determines that the linking information is stored in storage 127, linking resolution unit 125*b* performs the linking resolution by using the linking information without performing a query. Accordingly, the number of queries can be reduced.

Figure 13:
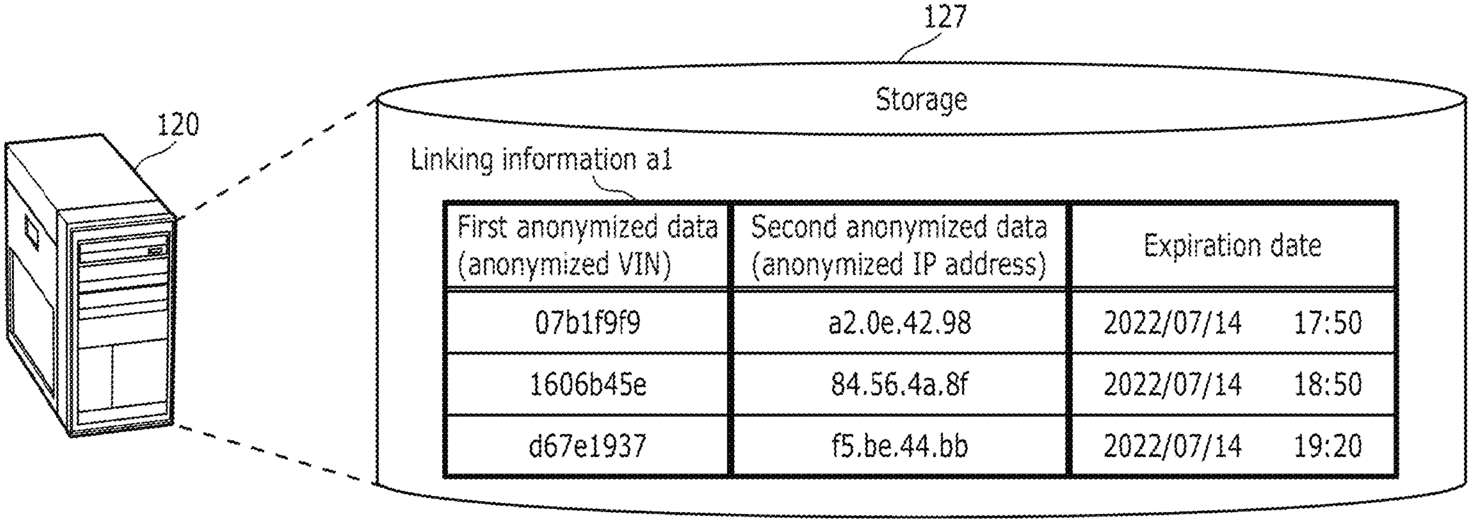
FIG. 13 is a diagram illustrating an example of linking information in Variation 4 of the embodiment.

FIG. 13 is a diagram illustrating an example of the linking information.

Linking information at stored in storage 127 indicates, for example, for each of one or more items of first anonymized data, the second anonymized data associated with the first anonymized data, and the expiration date of the association. For example, linking information a1 associates and indicates first anonymized data "07b1f9f9" with second anonymized data "a2.0e.42.98" and expiration date "2022/07/14 17:50". When the first anonymized data included in the first anonymized log, which is the target of the integrated analysis, is "07b1f9f9," linking resolution unit 125*b* determines whether or not linking information a1 indicating the first anonymized data is stored in storage 127.

Then, when linking resolution unit 125*b* determines that linking information a1 is stored in storage 127, linking resolution unit 125*b* checks the expiration date "2022/07/14 17:50" associated with the first anonymized data "07b1f9f9" in that linking information at. For example, linking resolution unit 125*b* determines whether or not the current time at which the linking resolution is to be performed has passed the expiration date "2022/07/14 17:50". That is, linking resolution unit 125*b* determines whether or not the linking to the first anonymized data "07b1f9f9" has exceeded the expiration date. When linking resolution unit 125*b* determines that the current time has not passed the expiration date, i.e., the linking has not exceeded the expiration date, linking resolution unit 125*b* performs the linking resolution without performing a query. Specifically, linking resolution unit 125*b* obtains, from storage 127, the second anonymized data "a2.0e.42.98" associated with the first anonymized data "07b1f9f9" in linking information at. Accordingly, the linking resolution is performed.

Note that it can be said that the above-described expiration date is the expiration date of linking information at. In addition, in the present variation, although the expiration date is indicated in linking information at, the expiration date need not be indicated.

Figure 14:
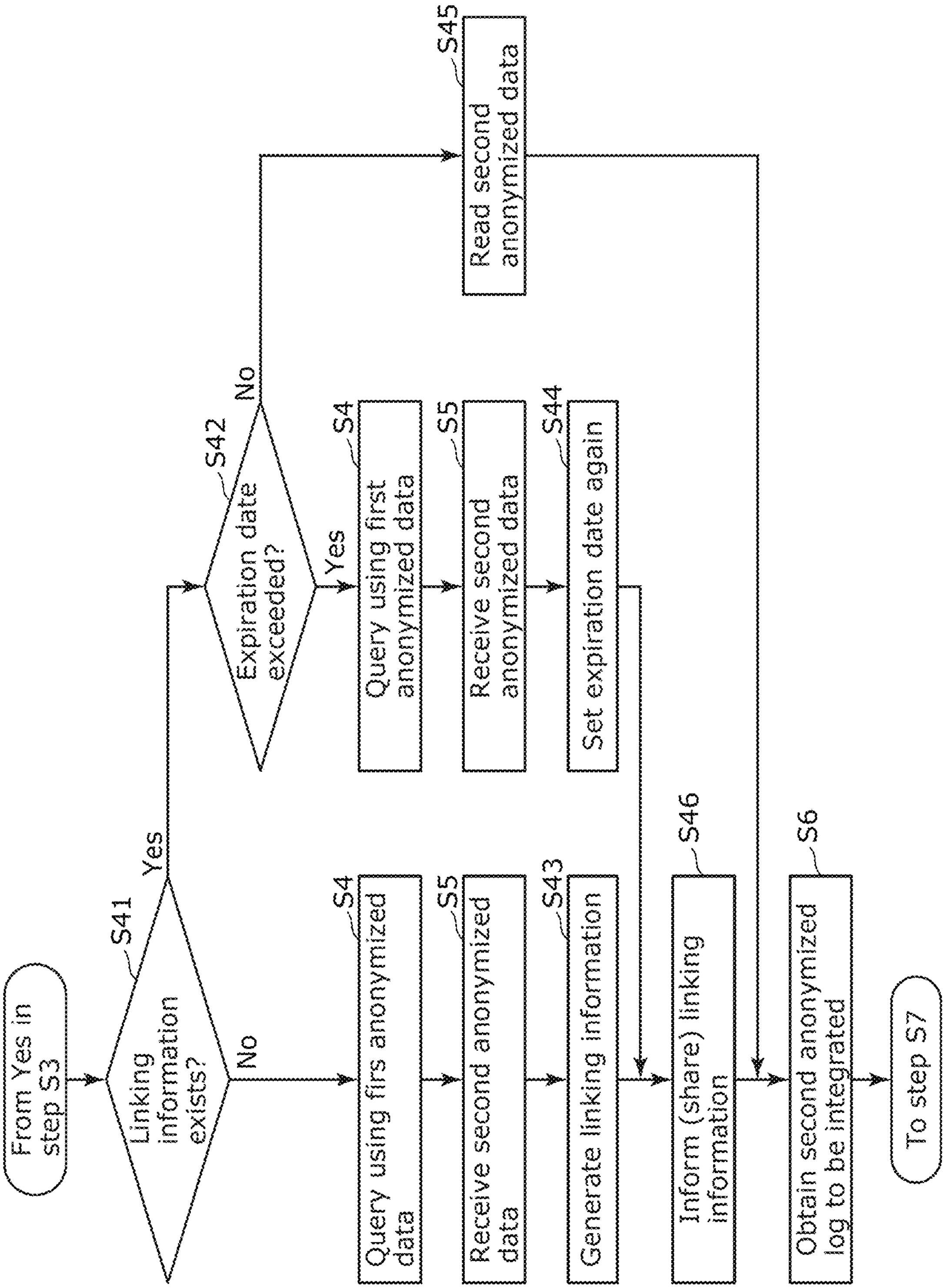
FIG. 14 is a flowchart illustrating an example of processing operations of a first analysis device in Variation 4 of the embodiment.

FIG. 14 is a flowchart illustrating an example of processing operations of first analysis device 120 in the present variation.

First analysis device 120 in the present variation performs the processing of steps S4 to S6 and S41 to S45 illustrated in FIG. 14 during a period since it is determined that the integrated analysis is required until the integrated analysis is performed, i.e., during a period since Yes in step S3 to step S7 in FIG. 4.

Specifically, when it is determined by integrated determiner 125*a* that the integrated analysis is required, linking resolution unit 125*b* determines whether or not linking information a1 is stored in storage 127 (step S41). That is, linking resolution unit 125*b* determines whether or not linking information a1 indicating the first anonymized data included in the first anonymized log, which is the target of the integrated analysis, is stored in storage 127. Here, when linking resolution unit 125*b* determines that linking information a1 is not stored (No in step S41), linking resolution unit 125*b* performs the processing in steps S4 and S5 as in the above-described embodiment. The linking resolution is performed by the processing in steps S4 and S5.

Then, linking resolution unit 125*b* generates linking information at that associates and indicates the second anonymized data with the first anonymized data, and stores linking information a1 in storage 127 (step S43). Note that, when linking information at is already stored in storage 127, and the first anonymized data is not indicated in linking information at, linking resolution unit 125*b* updates that linking information at. That is, linking resolution unit 125*b* updates linking information at by associating the first anonymized data and the second anonymized data with each other, and writing them in linking information at. Accordingly, updated linking information at is generated. Note that such updating of linking information a1 may be called updating of cache. Furthermore, linking resolution unit 125*b* transmits the latest linking information at that has been updated or generated to second analysis device 220 via transmitter 124 (step S46). Accordingly, the latest linking information a1 is informed to second analysis device 220, and is shared between first analysis device 120 and second analysis device 220. As a result, when second analysis device 220 also performs the linking resolution for the integrated analysis, second analysis device 220 can perform the linking resolution without a query, by referring to the latest linking information at that is shared.

Thereafter, system cooperator 125*c* obtains the second anonymized log to be integrated from second analysis device 220 by using the second anonymized data received in step S5 (step S6).

On the other hand, when linking resolution unit 125*b* determines that linking information a1 is stored in storage 127 in step S41 (Yes in step S41), linking resolution unit 125*b* determines whether or not the expiration date indicated in that linking information at has been exceeded (step S42). That is, linking resolution unit 125*b* identifies the expiration date associated with the first anonymized data in linking information at. Note that the first anonymized data is data included in the first anonymized log, which is the target of the integrated analysis. Then, linking resolution unit 125*b* determines whether or not the current time at which the linking resolution is to be performed has passed the expiration date.

Here, when linking resolution unit 125*b* determines that the current time has not passed the expiration date, i.e., the expiration date has not been exceeded (No in step S42), linking resolution unit 125*b* reads the second anonymized data associated with the first anonymized data in that linking information at (step S45). That is, the second anonymized data is read from storage 127. The linking resolution is performed by such processing in step S45 without a query. Then, system cooperator 125*c* performs the processing in step S6.

In addition, in step S42, when linking resolution unit 125*b* determines that the current time has passed the expiration date, that is, the expiration date has been exceeded (Yes in step S42), linking resolution unit 125*b* performs obtaining of the second anonymized data by a query (that is, the processing of steps S4 and S5). Then, linking resolution unit 125*b* sets an expiration date again (step S44). That is, linking resolution unit 125*b* updates the expiration date indicated in linking information a1 to a new expiration date that is a date beyond the current time. Then, linking resolution unit 125*b* performs the processing in step S46. Note that, in the updating of the expiration date, linking resolution unit 125*b* may update the expiration date indicated in linking information a1 to an expiration date determined by first server 110.

Figure 15:
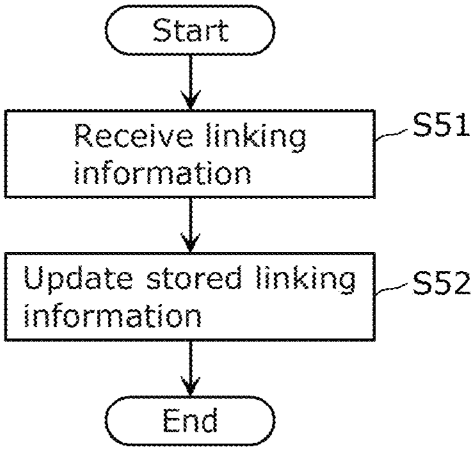
FIG. 15 is a flowchart illustrating an example of processing operations of a second analysis device in Variation 4 of the embodiment.

FIG. 15 is a flowchart illustrating an example of processing operations of second analysis device 220 in the present variation.

Second analysis device 220 receives linking information a1 transmitted from first analysis device 120 (step S51). Then, second analysis device 220 stores that linking information a1 in a recording medium included in second analysis device 220. At this time, when existing linking information at is stored in the recording medium, second analysis device 220 updates that existing linking information at to new linking information at received in step S51 (step S52). That is, updating of cache is performed in second analysis device 220.

In this manner, in the present variation, linking resolution unit 125*b* stores, in storage 127, linking information a1 indicating the association between the first anonymized data and the specific second anonymized data. Additionally, when linking resolution unit 125*b* repeatedly performs the linking resolution for the first anonymized data, linking resolution unit 125*b* performs the linking resolution by referring to linking information at stored in storage 127. Accordingly, when the linking resolution is repeatedly performed, since the linking resolution is performed by referring to linking information a1, the time and effort for first analysis device 120 to communicate with first server 110 or the like to perform the linking resolution can be saved. As a result, efficient linking resolution and integrated analysis can be realized. In addition, the number of queries can be reduced.

In addition, linking resolution unit 125*b* sets an expiration date to linking information a1, and when the timing for repeatedly performing the linking resolution for the first anonymized data has not passed the expiration date, linking resolution unit 125*b* performs the linking resolution by referring to linking information at stored in storage 127. Accordingly, since the expiration date is set to linking information a1, the corresponding relationship between the first anonymized data and the second anonymized data can be guaranteed until the expiration date, and the corresponding relationship can be changed after the expiration date. That is, after the expiration date, the mode for anonymization of each of first system 100 and second system 200 can be changed. As a result, the flexibility of overall processing operations of these systems can be increased.

In addition, system cooperator 125*c* transmits linking information a1 stored in storage 127 to second analysis device 220 of second system 200, which is the cooperative monitoring system. Accordingly, since linking information a1 is transmitted to second system 200, second system 200 can perform the linking resolution by using that linking information at. As a result, second system 200 (specifically, second analysis device 220) can also perform the integrated analysis as in first analysis device 120.

In addition, when linking information a1 stored in storage 127 is updated by linking resolution unit 125*b*, system cooperator 125*c* transmits updated linking information a1 to second analysis device 220 of second system 200, which is the cooperative monitoring system.

Accordingly, first analysis device 120 and second analysis device 220 can synchronize and manage common linking information a1. As a result, it is possible to improve the efficiency of the integrated analysis performed by first analysis device 120 and second analysis device 220.

Although the analysis device and the analysis method according to the present disclosure have been described above based on the above-described embodiment and variations, the present disclosure is not limited to the above-described embodiment and variations. Various modifications to the above-described embodiment according to the present disclosure described above that may be conceived by those skilled in the art may also be included within the scope of the present disclosure, unless such modifications depart from the essence of the present disclosure.

For example, although the VIN is used as an example of the first identification data and the IP address is used as an example of the second identification data in the above-described embodiment and each of the variations, each of the first identification data and the second identification data is not limited to the VIN or the IP address. Each of the first identification data and the second identification data may be privacy information, such as position information or a personal name. In addition, although the first identification data and the second identification data are used in the above-described embodiment and each of the variations, when anonymization is performed in mutually different modes in two or more mutually different systems, only one of the first identification data or the second identification data may be used.

In addition, although vehicle V is used as an example of the device to be monitored in the above-described embodiment and each of the variations, the device to be monitored is not limited to vehicle V, and may be other devices. Similarly, the first system and the second system are not limited to systems for vehicles, and may be any systems as long as they are systems compatible with a device to be monitored.

In addition, in the above-described embodiment and each of the variations, although the system that cooperates with first system 100 is one second system 200 only, first system 100 may cooperate with a plurality of second systems 200. That is, the number of cooperative monitoring systems that cooperate with first system 100 is not limited to one, and may be more than one.

In addition, the technique for anonymization used in the above-described embodiment and each of the variations may be any technique.

Note that each of the structural elements according to the above-described embodiment may be configured in the form of dedicated hardware or may be implemented by executing a software program suited to each of the structural elements. Alternatively, each of the structural elements may be implemented by a program executor such as a central processing unit (CPU) and a processor reading out and executing the software program recorded in a recording medium such as a hard disk or semiconductor memory. Here, the software program that implements the analysis device and so forth according to the above-described embodiment is a computer program that causes a computer to execute each step of the flowcharts illustrated in FIGS. 4, 6, 9, 11, 14, and 15.

Note that the following cases are also included in the present disclosure.

(1) At least one of the above-described devices may specifically be a computer system including, for example, a microprocessor, ROM, RAM, a hard disk unit, a display unit, a keyboard, and a mouse. The RAM or the hard disk unit stores computer programs. At least one of the above-described devices achieves its function as a result of the microprocessor operating in accordance with the computer programs. The computer programs as used herein are configured by a combination of a plurality of instruction codes that indicate commands given to the computer in order to achieve predetermined functions.

(2) One or more or all of the structural elements included in at least one of the above-described devices may be configured as single system large-scale integration (LSI). The system LSI is ultra-multifunctional LSI manufactured by integrating a plurality of components on a single chip, and specifically a computer system that may include, for example, a microprocessor, ROM, and RAM. The RAM stores computer programs. The system LSI achieves its function as a result of the microprocessor operating in accordance with the computer programs.

(3) One or more or all of the structural elements included in at least one of the above-described devices may each include an IC card or a stand-alone module that is detachable from the devices. The IC card or the module may be a computer system that may include, for example, a microprocessor, ROM, and RAM. The IC card or the module may include the aforementioned ultra-multifunctional LSI. The IC card or the module achieves its function as a result of the microprocessor operating in accordance with the computer programs. The IC card or the module may be tamper resistant.

(4) The present disclosure may be implemented as the above-described methods. The present disclosure may also be implemented as a computer program that realizes these methods by a computer, or may be implemented as digital signals generated by the computer program.

Moreover, the present disclosure may also be a computer program or digital signals recorded on a computer-readable recording medium, such as a flexible disk, a hard disk, a compact disc (CD)-ROM, a digital versatile disc (DVD), a DVD-ROM, a DVD-RAM, a Blu-ray (BD: registered trademark) disc, or semiconductor memory. The present disclosure may also be implemented as digital signals recorded on such a recording medium.

Moreover, the present disclosure may be implemented by transmitting computer programs or digital signals via, for example, telecommunication lines, wireless or wired communication lines, networks typified by the Internet, or data communications.

Moreover, the present disclosure may also be implemented as another independent computer system by transferring programs or digital signals recorded on a recording medium or by transferring programs or digital signals via, for example, a network.

While an exemplary embodiment has been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2022-166419 filed on Oct. 17, 2022 and PCT International Application No. PCT/JP2023/034739 filed on Sep. 25, 2023.

INDUSTRIAL APPLICABILITY

The analysis device in the present disclosure is applicable to, for example, a system that monitors vehicle control, and the like.

The invention claimed is:

1. An analysis device that transmits report information based on an analysis result of a log regarding a device to be monitored, the analysis device comprising:

at least one memory; and a processor connected to the at least one memory, wherein the processor:

performs obtaining processing for obtaining a first anonymized log that is the log including first anonymized data of the device to be monitored, the device being included in a Security Operation Center for vehicle control;

performs integrated determination processing for determining whether or not integrated analysis, that is analysis of a log group including the first anonymized log and a second anonymized log to be integrated, is required;

when the integrated analysis is determined to be required:

performs linking resolution that is processing for determining, from second anonymized data included in each of a plurality of second anonymized logs included in a cooperative monitoring system, second anonymized data corresponding to the first anonymized data as specific second anonymized data;

performs system cooperation processing for obtaining, from the cooperative monitoring system, the second anonymized log including the specific second anonymized data as the second anonymized log to be integrated; and performs the integrated analysis that is the analysis of the log group including the first anonymized log and the second anonymized log to be integrated; and when the integrated analysis is determined to not be required:

inhibits the integrated analysis from being performed in order to reduce a processing burden.

2. The analysis device according to claim 1, wherein the processor further:

performs transmission destination determination processing for determining a transmission destination according to a result of the integrated analysis; and performs transmission processing for transmitting the report information indicating the result of the integrated analysis to the transmission destination.

3. The analysis device according to claim 1, wherein in the system cooperation processing, the processor obtains the second anonymized log to be integrated from one or more second anonymized logs corresponding to at least one of a type or a time slot determined according to the first anonymized log, among the plurality of second anonymized logs.

4. The analysis device according to claim 1, wherein in the system cooperation processing, the processor specifies, from the plurality of second anonymized logs, the second anonymized log that matches a condition determined according to the first anonymized log by using at least one of a type or a time slot, so as to obtain the second anonymized log as the second anonymized log to be integrated.

5. The analysis device according to claim 1, wherein in the system cooperation processing, the processor further anonymizes the specific second anonymized data included in the second anonymized log.

6. The analysis device according to claim 1, wherein in the system cooperation processing, the processor further transmits the first anonymized log to the cooperative monitoring system, according to a request from the cooperative monitoring system.

7. The analysis device according to claim 1, wherein the processor:

stores, in a recording medium, linking information indicating an association between the first anonymized data and the specific second anonymized data; and when repeatedly performing the linking resolution for the first anonymized data, performs the linking resolution by referring to the linking information stored in the recording medium.

8. The analysis device according to claim 7, wherein the processor:

sets an expiration date to the linking information; and when a timing of repeatedly performing the linking resolution for the first anonymized data has not passed the expiration date, performs the linking resolution by referring to the linking information stored in the recording medium.

9. The analysis device according to claim 7, wherein in the system cooperation processing, the processor further transmits the linking information stored in the recording medium to the cooperative monitoring system.

10. The analysis device according to claim 9, wherein in the system cooperation processing, when the linking information stored in the recording medium is updated by the linking resolution, the processor further transmits the linking information that has been updated to the cooperative monitoring system.

11. The analysis device according to claim 1, wherein in the obtaining processing, the processor obtains the first anonymized log from a first server, the first server anonymizes, when a first log regarding the device to be monitored is obtained, first identification data of the device to be monitored included in the first log, so as to generate the first anonymized log including the first anonymized data, a second server included in the cooperative monitoring system anonymizes, when a second log regarding the device to be monitored is obtained, second identification data included in the second log, so as to generate the second anonymized log including the specific second anonymized data, and the processor performs the linking resolution by transmitting the first anonymized data to the first server and performing a query for the specific second anonymized data corresponding to the first anonymized data to the second server via the first server.

12. An analysis method for transmitting report information by a computer based on an analysis result of a log regarding a device to be monitored, the analysis method comprising:

obtaining a first anonymized log that is the log including first anonymized data of the device to be monitored, the device being included in a Security Operation Center for vehicle control;

performing integrated determination processing for determining whether or not integrated analysis, that is analysis of a log group including the first anonymized log and a second anonymized log to be integrated, is required;

when the integrated analysis is determined to be required:

performing linking resolution that is processing for determining, from second anonymized data included in each of a plurality of second anonymized logs included in a cooperative monitoring system, second anonymized data corresponding to the first anonymized data as specific second anonymized data;

obtaining, from the cooperative monitoring system, the second anonymized log including the specific second anonymized data as the second anonymized log to be integrated; and performing the integrated analysis of the log group including the first anonymized log and the second anonymized log to be integrated as the integrated analysis; and when the integrated analysis is determined to not be required:

inhibiting the integrated analysis from being performed in order to reduce a processing burden.

* * * * *